United States Patent [19]
Faget et al.

[11] Patent Number: 5,909,562
[45] Date of Patent: *Jun. 1, 1999

[54] BACKUP FIFO IN-LINE STORAGE

[75] Inventors: Roy R Faget; Ronald D Larson, both of Fort Collins, Colo.

[73] Assignee: Hewlett-Packard Co., Palo Alto, Calif.

[*] Notice: This patent is subject to a terminal disclaimer.

[21] Appl. No.: 08/846,831

[22] Filed: May 1, 1997

[51] Int. Cl.$^6$ .................................................. G06F 13/38
[52] U.S. Cl. ........................... 395/309; 395/310; 395/872
[58] Field of Search .................................... 395/309, 310, 395/872–877

[56] References Cited

U.S. PATENT DOCUMENTS

| | | | |
|---|---|---|---|
| 4,536,873 | 8/1985 | Leete ............................................... | 370/85 |
| 4,760,571 | 7/1988 | Schwarz .......................................... | 370/86 |
| 4,884,192 | 11/1989 | Tereda et al. ................................. | 364/200 |
| 5,128,931 | 7/1992 | Yamanaka et al. ............................ | 370/60 |
| 5,243,596 | 9/1993 | Port et al. ..................................... | 370/94.1 |
| 5,278,828 | 1/1994 | Chao ............................................... | 370/85.6 |
| 5,434,848 | 7/1995 | Chimento, Jr. et al. ..................... | 370/17 |
| 5,457,687 | 10/1995 | Newman ......................................... | 370/85.3 |
| 5,504,918 | 4/1996 | Collette et al. ............................... | 395/800 |
| 5,541,922 | 7/1996 | Pyhalammi ..................................... | 370/82 |
| 5,550,823 | 8/1996 | Irie et al. ....................................... | 370/60.1 |
| 5,574,931 | 11/1996 | Letellier et al. ............................... | 395/800 |
| 5,611,047 | 3/1997 | Wakamiya et al. ........................... | 395/200.01 |
| 5,629,928 | 5/1997 | Calvignac et al. ............................ | 370/237 |
| 5,664,161 | 9/1997 | Fukushima et al. ........................... | 345/501 |
| 5,687,324 | 11/1997 | Green et al. ................................... | 395/250 |
| 5,704,047 | 12/1997 | Schneeberger ................................ | 395/200 |
| 5,745,684 | 4/1998 | Oskouy et al. ................................ | 395/200.8 |
| 5,760,792 | 6/1998 | Holt et al. ...................................... | 345/509 |

FOREIGN PATENT DOCUMENTS 0 367 183 A3   5/1990   European Pat. Off. ........ G06F 15/66

*Primary Examiner*—Ayaz R. Sheikh
*Assistant Examiner*—Jigar Pancholi

[57] ABSTRACT

An interface circuit included in a ring interconnected group of processing elements includes a backup FIFO to temporarily store information received by the interface circuit when it receives an indication that it temporarily should not forward information to the next processing element in the ring. The interface circuit can receive such an indication, for example, when it receives a signal from the downstream processing element in the ring indicating that the downstream circuit is unable to receive information, or when it receives an information packet requesting a read from the core of the processing element. When the interface circuit receives such an indication, it de-asserts an outgoing ready signal to the upstream processing element in the ring, which should cause the upstream processing element to stop sending information. Once the interface circuit receives an indication that it again may transmit information, the contents of the backup FIFO is released to the output of the interface and possibly is mixed with read data from the core. The control of the flow of information into and out of the backup FIFO is accomplished by storing information in single-bit registers within the control logic of the ASIC in which the interface circuit is implemented that identifies the contents of the various registers in the backup FIFO. In this manner, the information flow into and out of the backup FIFO may be controlled by inspecting the single-bit registers rather than decoding the contents of the backup FIFO itself.

17 Claims, 11 Drawing Sheets

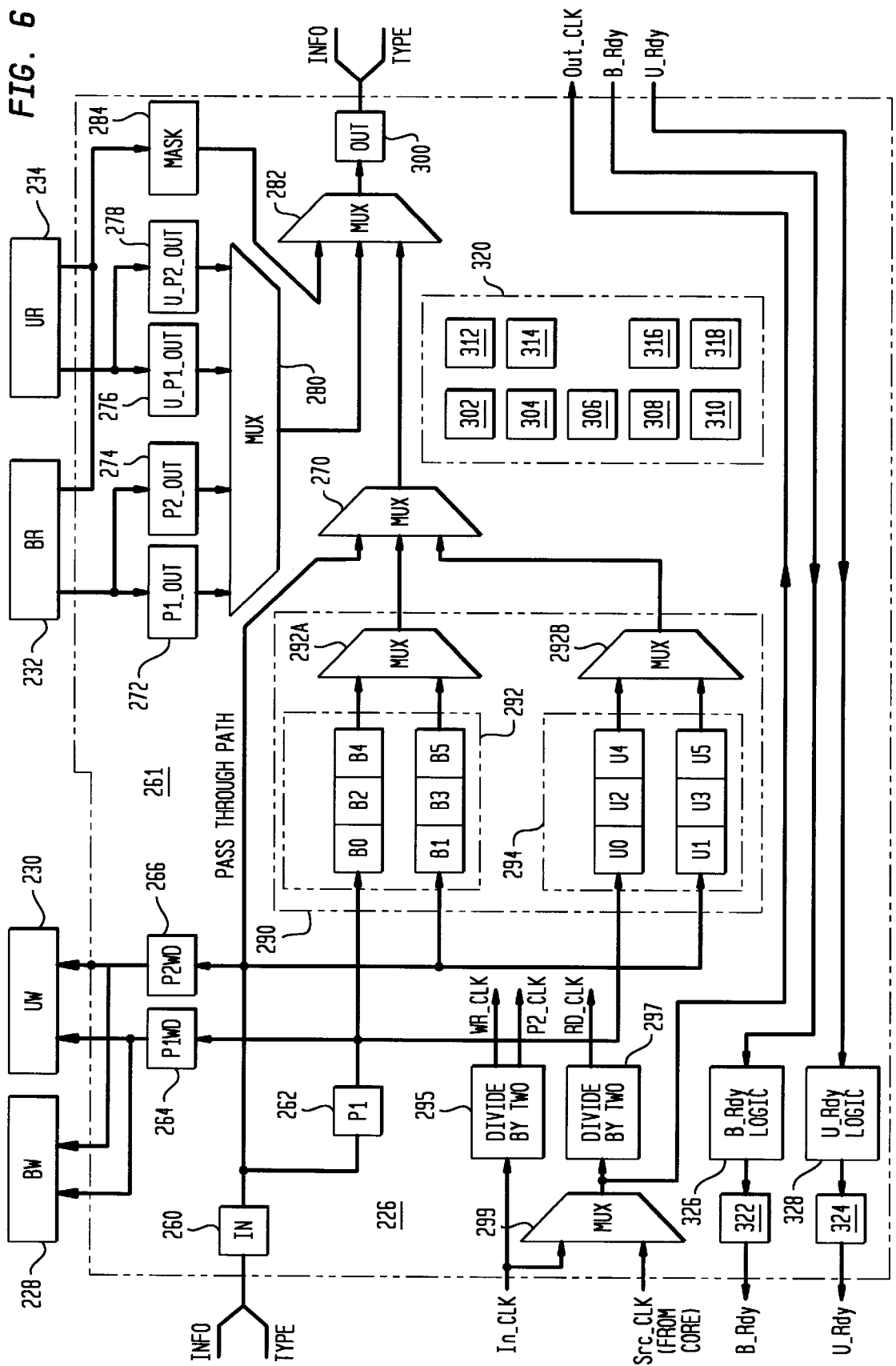

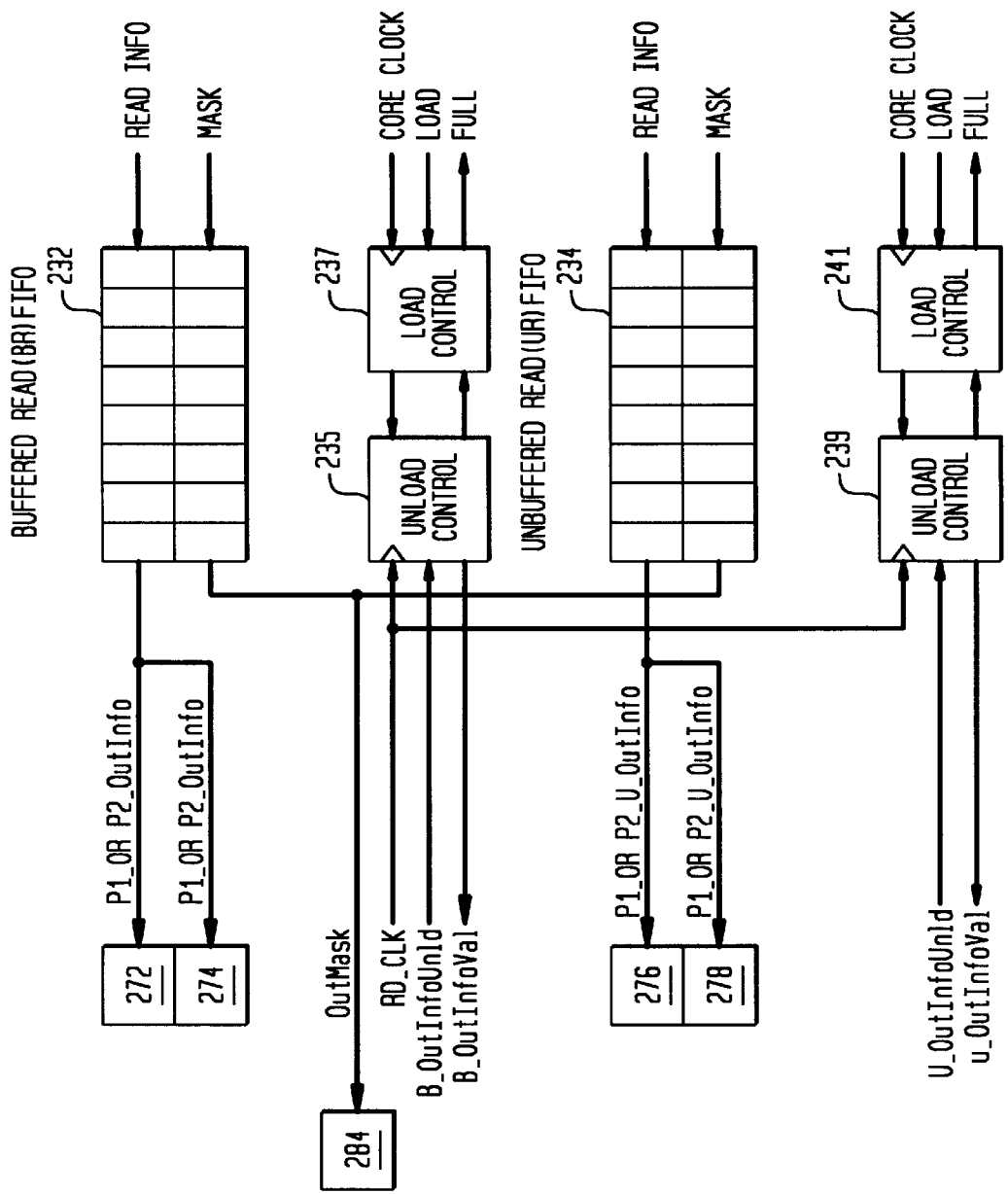

BACKUP FIFO IN-LINE STORAGE

FIELD OF THE INVENTION

This invention relates generally to the field of computer systems and, more particularly, to interface circuits for pipelined digital communications.

BACKGROUND OF THE INVENTION

Computer graphics systems commonly are used for displaying graphical representations of objects on a two dimensional display screen. Current computer graphics systems can provide highly detailed representations and are used in a variety of applications.

In typical computer graphics systems, an object to be represented on a display screen is broken down into a plurality of graphics primitives. Primitives are basic components of a graphics picture such as points, lines, vectors and polygons (e.g., triangles). Typically, a hardware/software scheme is implemented to render (draw) on a two-dimensional display screen, the graphics primitives that comprise a view of one or more objects.

A host computer commonly provides primitive data that represents the primitives of a three-dimensional object to be rendered. When the primitive is a triangle, for example, the host computer may define the triangle in terms of the x, y, z coordinates and the red, green, blue (R, G, B) color values of each vertex. Rendering hardware interpolates the primitive data to compute the display screen pixels that constitute each primitive, and the R, G, B color values for each pixel.

The basic components of a typical computer graphics system include a geometry accelerator, a rasterizer and a frame buffer. The system also may include other hardware such as texture mapping hardware (described below). The geometry accelerator receives, from the host computer, vertex coordinate and color data for primitives that constitute an object. The geometry accelerator typically performs transformations on the vertex coordinate data (i.e., to screen space coordinates), decomposes quadrilaterals intro triangles, and may perform other functions such as lighting, clipping and performing plane equation calculations for each primitive. The output from the geometry accelerator, referred to as rendering data, is used by the rasterizer (and optional texture mapping hardware) to compute final screen space coordinates and R, G, B color values for each pixel constituting the primitives. The final data is stored in the frame buffer for display on a display screen. Some graphics systems are pipelined such that various operations (such as transformations, interpolation, etc.) are performed simultaneously by different components on different object primitives.

More sophisticated systems offer texture mapping as an option so that objects can be displayed with improved surface detail. Texture mapping is a method that involves mapping a source image, referred to as a texture, onto a surface of a three-dimensional object, and thereafter mapping the textured three-dimensional object to the two-dimensional graphics display screen to display the resulting image. Texture mapping involves applying one or more point elements (texels) of a texture to each point element (pixel) of the displayed portion of the object to which the texture is being mapped. Texture mapping hardware subsystems typically include a local memory that stores texture data associated with the portion of the object being rendered.

Pipelined graphics systems, particularly those that offer data-intensive texture mapping, commonly include complex bus structures on which data is communicated between the various components. System bandwidth often is compromised as a result. In such systems, it is common, for example, to have data paths (buses) dedicated to particular data types and operations, which paths remain otherwise unused. In the absence of such dedicated paths, the pipelined main rendering bus system may have to be flushed to perform certain operations, such as downloading texture data from the host to a local texture mapping memory. In addition, in systems having multiple chips connected in parallel, often the bus structure includes a separate bus to each of those chips, further reducing system bandwidth.

System bandwidth is directly related to the system performance. As technology advances, the host processors are capable of providing primitive data at increased speeds to the graphics rendering chips. In order to accommodate the increased technology of the host processors, a bus structure that is capable of handling high bandwidth communications is required.

It accordingly is a general object of the present invention to provide an improved bus structure and data communication protocol for a pipelined computer graphics system which maximizes system bandwidth.

SUMMARY OF THE INVENTION

According to one embodiment of the present invention, an interface circuit includes an input storage element, an output storage element, and a backup storage element. The input storage element is adapted to receive information from an input bus during a first clock cycle, and the output storage element is adapted to provide to the output bus, during a second clock cycle following the first clock cycle, the information that was received by the input storage element during the first clock cycle. The backup storage element is arranged such that, when the interface circuit receives an indication that the output storage element should not provide information to the output bus, the backup storage element temporarily stores information received by the input storage element.

According to another embodiment, the interface circuit is configured such that, if the interface circuit receives the indication that the output storage element should not provide information to the output bus, then the interface circuit de-asserts an information ready signal provided to an upstream circuit to indicate to the upstream circuit that the upstream circuit should stop sending information on the input bus.

According to another embodiment of the invention, the interface circuit also includes a contents-identifying storage element, separate from the backup storage element, that is adapted to store information identifying the contents, if any, of either the backup storage element or the input storage element.

According to yet another embodiment, the interface circuit includes enough contents-identifying storage elements to store information identifying the contents, if any, of each of several backup storage elements included in the information backup path.

According to another embodiment of the invention, information is received from an input bus by an interface circuit. The interface circuit receives an indication that either (a) information may be transmitted on an output bus of the interface circuit, or (b) information should not be transmitted on the output bus. When the interface circuit receives the indication that information should not be transmitted on the output bus, the information received from the input bus is transferred to a backup information path. When the interface circuit receives the indication that information may be transmitted on the output bus: (1) if any information has been transferred to the backup information path, then the information transferred to the backup information path is transmitted on the output bus, and (2) if the backup information path is empty, the information received on the input bus is transmitted on the output bus.

According to another embodiment, the method according to the invention includes a step requiring that, when the interface circuit receives the indication that information should not be transmitted on the output bus, it de-asserts an information ready signal provided to an upstream circuit to indicate to the upstream circuit that the upstream circuit should stop sending information on the input bus.

The features and advantages of the present invention will be more readily understood and apparent from the following detailed description of the invention, which should be read in conjunction with the accompanying drawings and from the claims which are appended to the end of the detailed description.

BRIEF DESCRIPTION OF THE DRAWINGS

For a better understanding of the present invention, reference is made to the accompanying drawings, which are incorporated herein by reference and in which:

FIG. 6 is a more detailed block diagram of one of the interface circuits shown in FIG. 4;

FIG. 13 is a more detailed block diagram of the buffered and unbuffered read FIFOs shown in FIG. 6 and shows how these FIFOs might operate when a processing element is not configured in detour mode.

DETAILED DESCRIPTION OF THE INVENTION

1. System Overview

Figure 1:
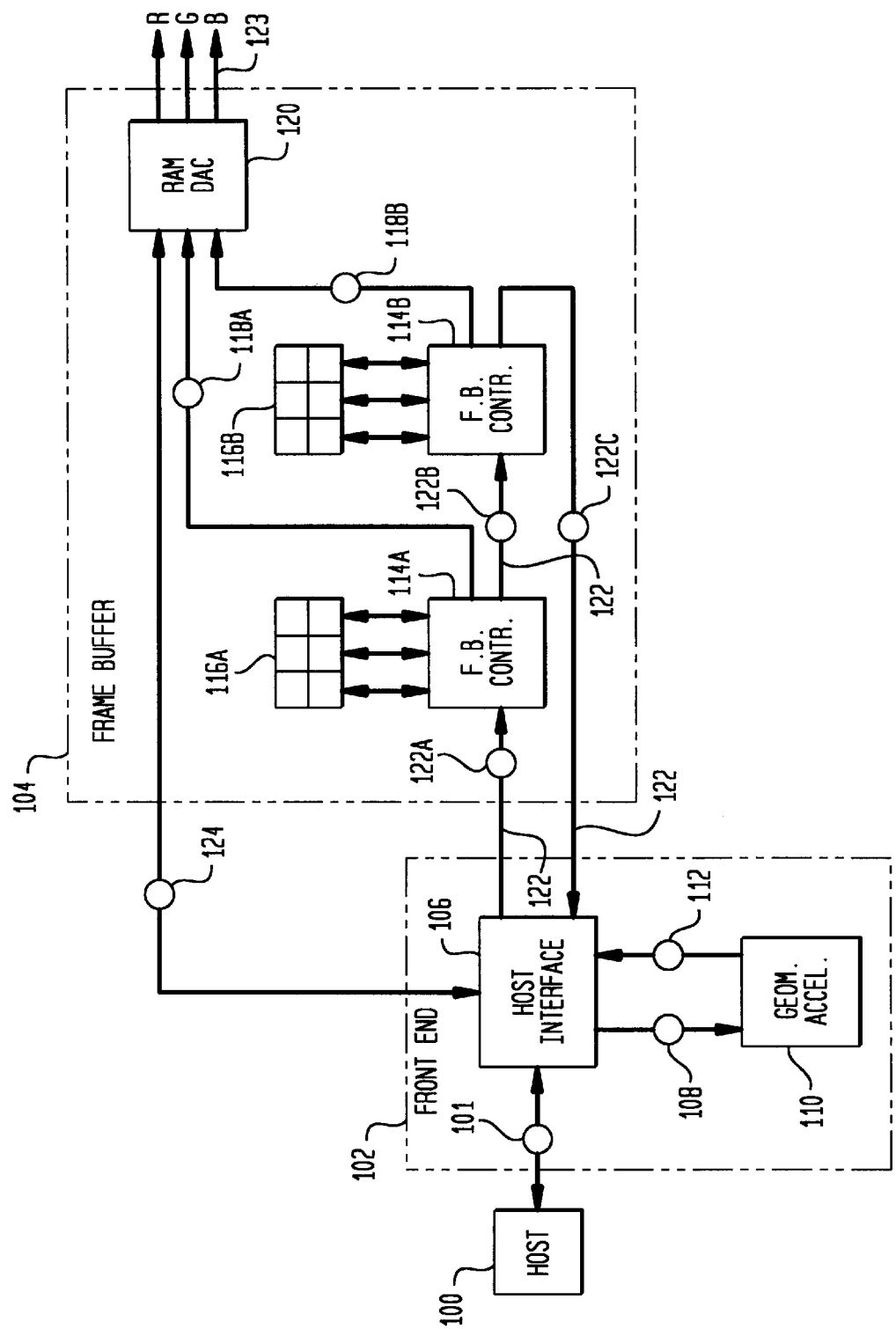
FIGS. 1–3 are block diagrams of pipelined computer graphics systems employing the bus architecture of the invention.
Figure 2:
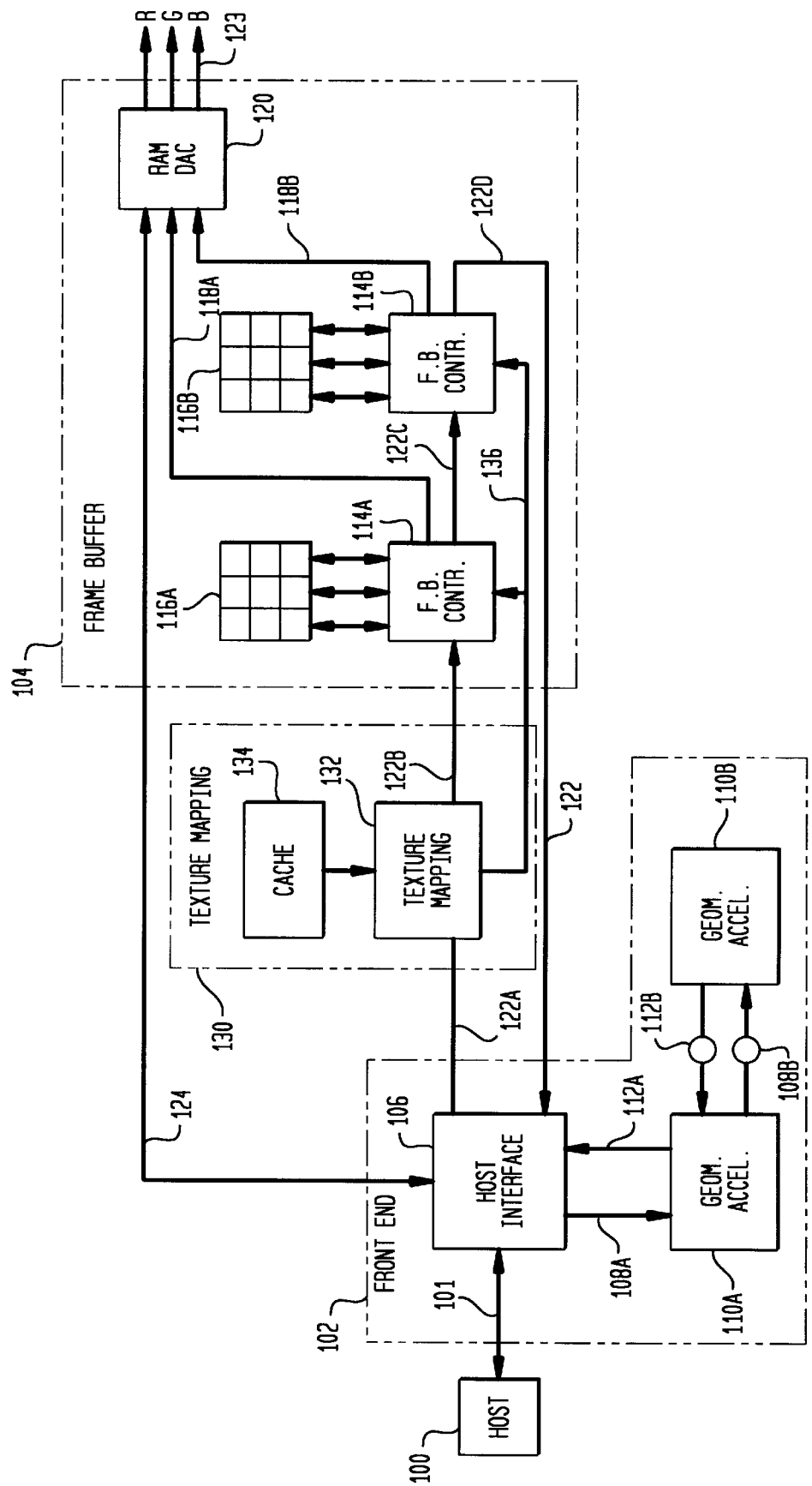
Figure 3:
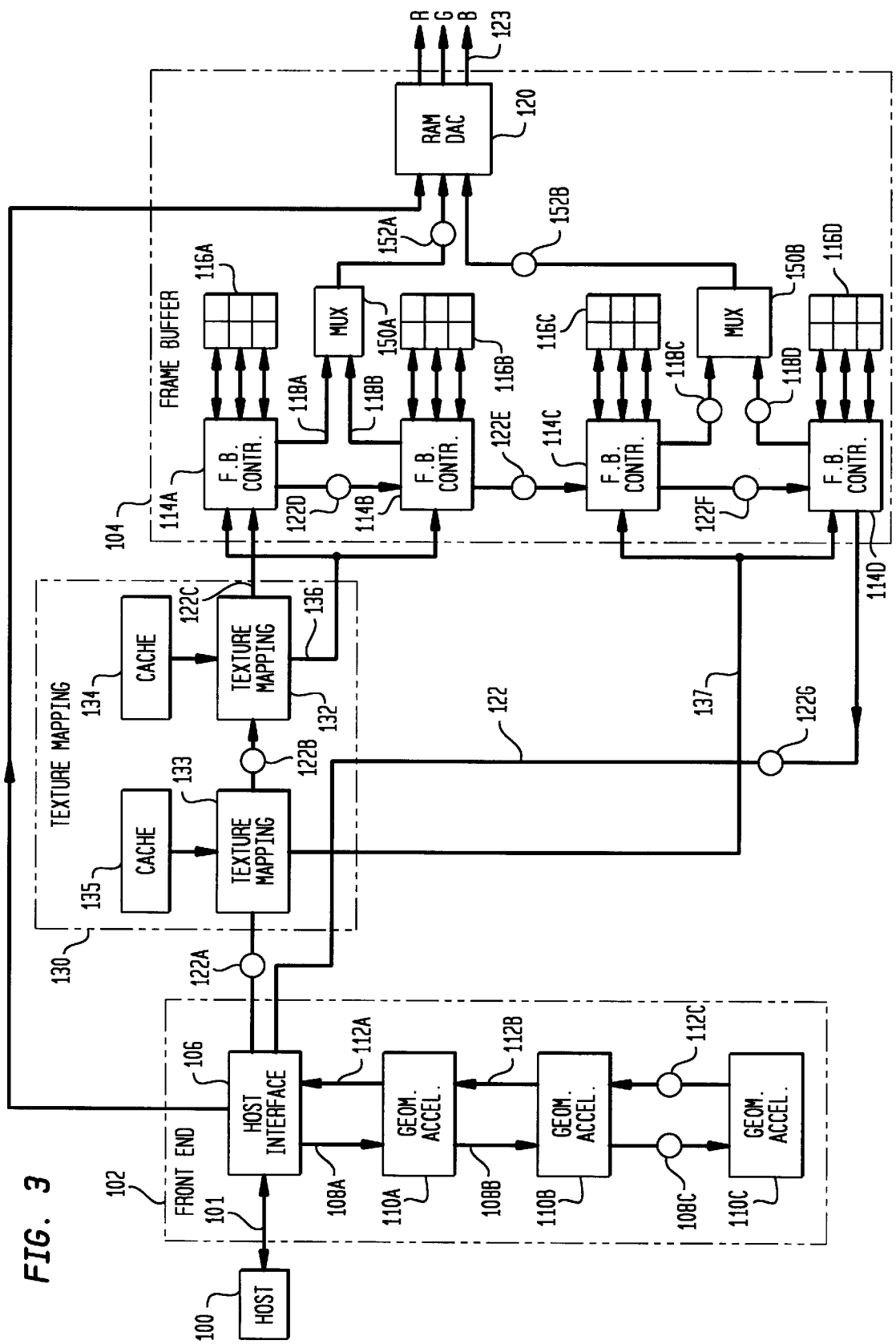

FIGS. 1–3 are block diagrams showing different exemplary embodiments of computer graphics systems that employ a busing architecture and data transfer protocol according to the present invention. Each system has a different number of components and, therefore, offers a different level of performance; two of the systems shown also offer an additional texture mapping feature. It should be understood that the systems shown are exemplary and in no way limiting and that any data transfer system could utilize the busing architecture and data transfer protocol of the invention.

FIG. 1 shows the simplest system of the three. As shown, the system includes a host computer 100, a front end subsystem 102 and a frame buffer subsystem 104. Front end subsystem 102 receives primitives to be rendered from host computer 100 over bus 101. The primitives typically are specified by x, y, z coordinate data, R, G, B color data, and alpha blending data, for each of certain portions of the primitives, such as the triangle vertices.

Data representing the primitives in three dimensions is provided by front end subsystem 102 to the frame buffer subsystem over bus 122, having segments 122A, 122B and 122C. Frame buffer subsystem 104 interpolates the rendering data received from front end subsystem 102 to compute the pixels on the display screen that will represent each primitive, and to determine resulting object R, G, B color values for each pixel. R, G, B color control signals for each pixel respectively are provided over R, G, B lines 123 to control the pixels of the display screen (not shown) to display a resulting image thereon.

In the embodiment shown in FIG. 1, front end subsystem 102 includes a host interface 106 and a three-dimensional (3-D) geometry accelerator 110. As noted, host interface 106 receives the x, y, z coordinates and color primitive data along bus 101 from host computer 100. Such data is provided from host interface 106 to geometry accelerator 110 along bus 108. Geometry accelerator 110 performs conventional geometry accelerator functions resulting in rendering data for display. Such functions may include three-dimensional transformation, lighting, clipping, and perspective divide operations, as well as plane equation generating, done in floating point format. The rendering data is provided by geometry accelerator 110 along bus 112 to host interface 106, which re-formats the rendering data, performs a floating point to fixed point conversion, and provides such data along bus system 122 to frame buffer subsystem 104.

In this embodiment, frame buffer subsystem 104 includes two frame buffer controllers 114A and 114B, each having a respective synchronous graphics random access memory (SGRAM) 116A and 116B, as well as a random access memory digital-to-analog converter (RAMDAC) 120. Connected to bus system 122 are both frame buffer controllers 114A and 114B and host interface 106. In this embodiment, bus 122 includes three buses 122A, 122B and 122C, each identical to the other. The bus architecture 122 and associated data transfer protocol, which will be discussed in more detail below, offer improved bandwidth over prior art architectures and protocols.

In the embodiment of FIG. 1, each frame buffer controller 114A and 114B receives rendering data from host interface 106. Each frame buffer controller may control different, non-overlapping segments of the display screen. The frame buffer controllers may interpolate the primitive data to compute the screen display pixel coordinates that represent the primitive, and the corresponding object R, G, B color values for each pixel coordinate.

The resulting image video data generated by frame buffer controllers 114A and 114B, including R, G, B values for each pixel, may be stored in the corresponding SGRAMs 116A and 116B. Video data may be retrieved from the SGRAM chips into the frame buffer controllers, reformatted so that it can be handled by RAMDAC 120, and provided to the RAMDAC. RAMDAC 120, in turn, may convert the digital color data to analog R, G, B color control signals for each pixel, which are provided along R, G, B lines 123 to control a screen display (not shown).

Host interface 106 also may communicate directly with RAMDAC 120 through video bus 124. The system preferably is a pipelined system such that frame buffer subsystem 104 may operate on a first primitive while front end subsystem 102 is operating on a subsequent (in time) primitive.

The bus system of the present invention also may be employed in the graphics system shown in FIG. 2. The system shown in FIG. 2 is similar to the system shown in FIG. 1 except that: (1) two 3-D geometry accelerators 110A and 110B are included in the front end subsystem 102, (2) a texture mapping subsystem 130 is employed, and (3) each SGRAM memory 116A and 116B has been increased in capacity. With two geometry accelerators 110A and 110B, the primitive data is allocated among the geometry accelerators in accordance with the data transfer protocol of the invention, described in more detail below.

Texture mapping subsystem 130 may be any subsystem that carries out texture mapping operations and, in this exemplary embodiment, includes a texture mapping circuit 132 and associated local cache memory 134 which stores a limited amount of texture data.

In this embodiment, bus 122 includes portions 122A–122D. Texture mapping circuit 132 is connected to bus 122 between host interface 106 and frame buffer controller 114A. During operation, texture mapping circuit 132, like both frame buffer controller circuits 114A and 114B, receives primitive data on bus 122A. The data may include x, y, z object pixel coordinates, object R, G, B color values, and S, T texture map coordinates for at least one vertex, and the plane equation of the primitive (i.e., triangle). Texture mapping circuit 132 may interpolate the x, y pixel coordinates and the S, T texture coordinates to compute resultant texture data for each pixel. The texture data for each pixel may, at any one time, be stored in cache memory 134. If so, then the texture data is read from cache memory 134. If the texture data needed is not at that time present in cache memory 134, then, without requiring the flushing of the data rendering pipeline or a dedicated texture data path, the needed texture data is downloaded from the host computer in an efficient manner in accordance with the present invention, as will be described in greater detail below.

The texture data for each pixel may be provided along texel bus 136 to each frame buffer controller 114A and 114B where it is combined, on a pixel-by-pixel basis, with object R, G, B color values by each frame buffer controller.

It should be understood that front end subsystem 102, frame buffer subsystem 104 and texture mapping subsystem 130 may be any presently known subsystems or later-developed subsystems. Additionally, each of such subsystems preferably is pipelined and operates on multiple primitives simultaneously. As such, while texture mapping subsystem 130 and frame buffer subsystem 104 operate on primitives previously provided by front end subsystem 102, front end subsystem 102 continues to operate on new primitives until the pipelines in such downstream subsystems become full.

The bus architecture of the present invention is configured such that different types of graphics processing chips may be arranged interchangeably within the architecture. That is each chip connected to the bus 122 could perform any graphics function such as texture mapping, frame buffer control, or other such functions.

FIG. 3 is a block diagram showing a further embodiment of a graphics system that employs the bus architecture of the present invention. In the system of FIG. 3, front end subsystem 102 includes three 3-D geometry accelerators 110A, 110B and 110C; frame buffer subsystem 104 includes four frame buffer controllers 114A–114D, each with an associated SGRAM memory 116A–116D, respectively; and texture mapping subsystem 130 includes two texture mapping circuits 132 and 133, each with an associated cache memory 134 and 135, respectively.

Connected by bus segments 122A–G of bus architecture 122 of the present invention are host interface 106, each of texture mapping circuits 132 and 133, and each of the frame buffer controllers 114A–114D. Texel bus 137 is connected between texture mapping circuit 133 and each of frame buffer controllers 114C and 114D. Operation is similar to that described with reference to FIG. 2.

2. The Bus Interconnect System

Figure 4:
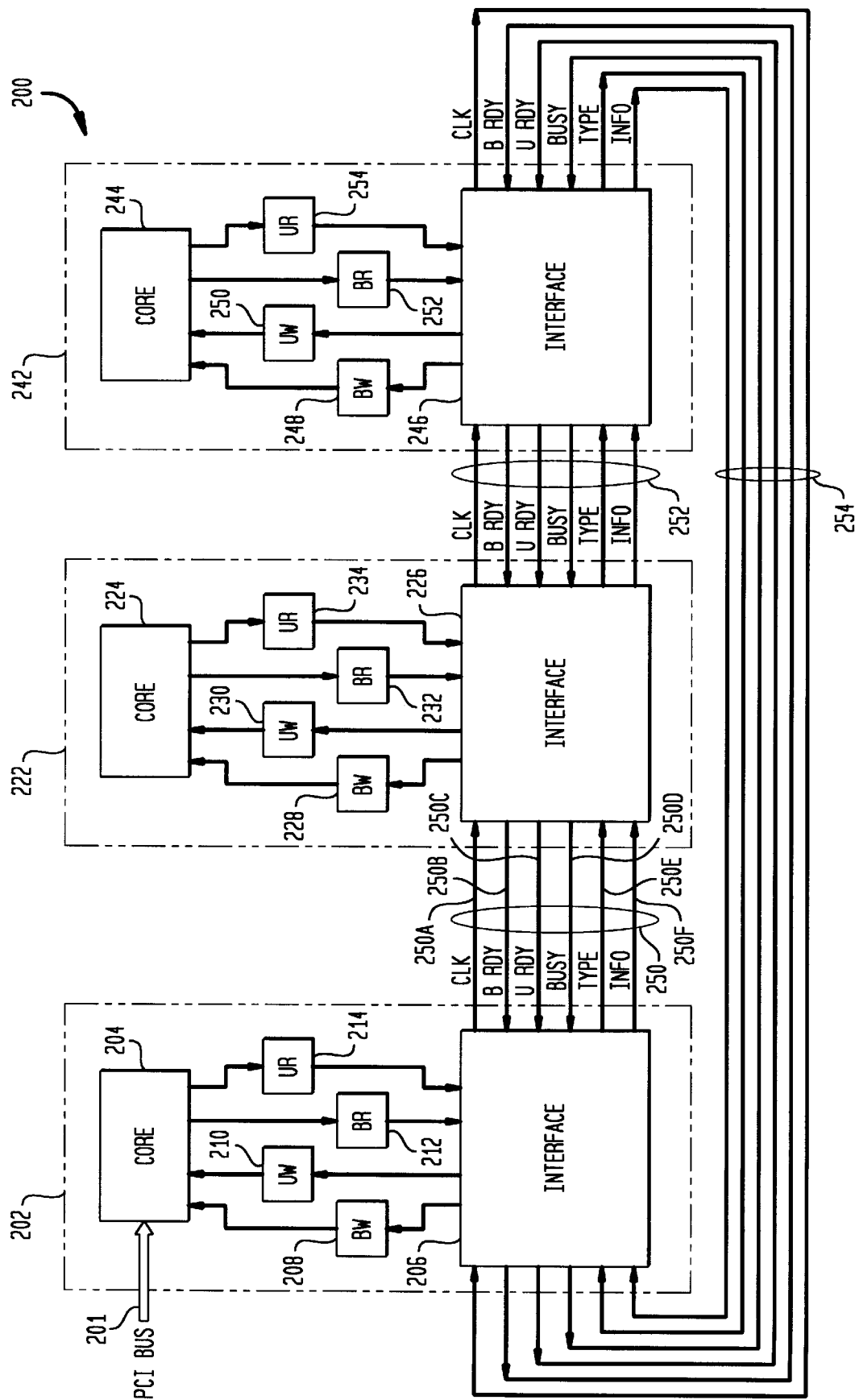
FIG. 4 is a block diagram showing a generic embodiment of the bus architecture of the invention.

Referring now to FIG. 4, a block diagram of a bus interconnect system 200 according to the present invention is shown. Bus interconnect system 200, which may be used to interconnect a number of graphics chips (e.g., frame buffer controllers), includes a number of processing elements 202, 222 and 242. Processing element 202 is interfaced to an external host device (not shown), such as a central processing unit (CPU), via a peripheral component interconnect (PCI) bus 201. Each of processing elements 202, 222 and 242 preferably includes an application specific integrated circuit (ASIC) chip, the core of which may be configured as any type of graphics processing device such as a frame buffer controller, a texture mapping device, etc.

Examples of systems that could employ bus interconnect network 200 are illustrated in FIGS. (1–3. In FIG. 1, for example, host interface 106 is coupled to the host computer 100 via bus 101, and host interface 106 is ring interconnected with frame buffer controllers 114A and 114B. Thus, in this example, processing element 202 (FIG. 4) could correspond to host interface 106 (FIG. 1), PCI bus 201 (FIG. 4) could correspond to bus 101 (FIG. 1), and processing elements 222 and 242 (FIG. 4) could correspond, respectively, to frame buffer controllers 114A and 114B (FIG. 1).

As shown in FIG. 4, each of processing elements 202, 222 and 242 includes a core processor 204, 224 and 244, and an interface circuit 206, 226 and 246, respectively. The core processor of each processing element may be the same or different, while interface circuits 206, 226, and 246 (preferably) are identical. Coupled between each core processor 204, 224 and 244 and its associated interface 206, 226 and 246 are several asynchronous first-in-first-out buffers (FIFOs) 208, 210, 212, 214, 228, 230, 232, 234, 248, 250, 252 and 254. These asynchronous FIFOs provide buffered (i.e., non-priority) information paths and unbuffered (i.e., priority) information paths both from interface circuits 206, 226 and 246 to core processors 204, 224 and 244, respectively, and from core processors 204, 224 and 244 to interface circuits 206, 226 and 246, respectively.

The distinction between buffered (i.e., non-priority) information and unbuffered (i.e., priority) information and the processing of each type of information between buffered (i.e., non-priority) and unbuffered (i.e., priority) information paths, respectively, will be explained in more detail below. At this juncture, however, it should be understood that two distinct types of information may be transmitted between processing elements using a shared bus. Each packet of information is identified (by setting particular bits in type field data transmitted concurrently therewith) as being either buffered (i.e., non-priority) or unbuffered (i.e., priority) information. After being received by an interface circuit, information identified as being buffered is transferred to a storage element that receives only buffered information (i.e., a non-priority information storage element) and information identified as being unbuffered is transferred to a storage element that receives only unbuffered information (i.e., a priority information storage element).

By controlling the interface circuits in the ring so that unbuffered (i.e., priority) information always takes precedence over buffered (i.e., non-priority) information, but so that non-priority information is held in an information path that is separate from the unbuffered (i.e., priority) information path until the unbuffered (i.e., priority) information is through being processed, significant advantages are provided over systems in which a pipeline path must be "flushed" before priority information may be forwarded through it.

It should also be understood that, although priority information is identified herein as being "unbuffered," it nevertheless is processed through information storage elements, and as such, it really is "buffered" in the common sense of the word. Nevertheless, priority information is referred to herein as being unbuffered, since, with respect to the non-priority information, it is, in a sense, unbuffered.

Referring still to FIG. 4, using processing element 222 as an example, buffered write (BW) FIFO 228 (i.e., a non-priority interface output storage element) is coupled between interface circuit 226 and core processor 224 so as to provide a buffered (i.e., non-priority) information path from the interface circuit to the core processor. Similarly, unbuffered write (UW) FIFO 230 (i.e., a priority interface output storage element) is coupled between interface circuit 226 and core processor 224 so as to provide an unbuffered (i.e., priority) information path from the interface circuit to the core processor. Additionally, buffered read (BR) FIFO 232 (i.e., a non-priority interface input storage element) is coupled between core processor 224 and interface circuit 226 so as to provide a buffered (i.e., non-priority) information path between the core processor and the interface circuit. Finally, unbuffered read (UR) FIFO 234 (i.e., a priority interface input storage element) is coupled between core processor 224 and interface circuit 226 so as to provide an unbuffered (i.e., priority) information path between the core processor and the interface circuit. The arrangement and operation of exemplary read and write FIFOs 228, 230, 232 and 234 is shown and described in more detail below.

Processing elements 202, 222 and 242 are interconnected by a unidirectional bus including bus segments 250, 252 and 254. Bus segments 250, 252 and 254 of interconnect network 200 are identical in construction and width. As shown, bus segments 250, 252 and 254 interconnect processing elements 202, 222 and 242 in a ring format, with bus segment 250 interconnecting processing elements 202 and 222, bus segment 252 interconnecting processing elements 222 and 242, and bus segment 254 interconnecting processing elements 242 and 202. In this manner, information from processing element 202 is forwarded to processing element 222, information from processing element 222 is forwarded to processing element 242, and information from processing element 242 is returned to processing element 202.

By using the arrangement shown in FIG. 4, information may be exchanged between the external host device and processing element 202 (via PCI bus 201), and information may be circulated unidirectionally from each of processing elements 202, 222 and 242 to the processing element that follows it in the ring. This circular arrangement provides simple point-to-point connections between each adjacent pair of processing elements such that the output of each interface is required to drive the input of only the one interface that follows it in the ring. Because each processing element drives only one load, signal integrity problems are minimized and, as a result, a high bus bandwidth may be attained.

Additionally, in this embodiment, the information that is transferred from element to element is transferred along with a clock signal. As such, the need to provide system-wide clock synchronization is eliminated, and the addition of extra processing elements is achieved by merely plugging a new processing element into the ring. That is, this transferring of the clock with the information permits the number of elements included in the bus to be virtually without limit, although the integrity of the clock signal will, of course, degrade as the number of processing elements in the ring is increased.

Thus, the ring interconnect system according to the invention allows for an increase in communication bandwidth with a bus having a decreased width. High throughput is achieved by quickly forwarding information through interfaces of the ring, while allowing the core processors of each element to process commands asynchronously from the information transfer rate. Routing and signal integrity problems are reduced because the bus width is reduced and because there is only one load per bus. In addition, with the clock being transmitted with the information in the ring arrangement, additional processing elements may easily be added to or deleted from the ring network without adverse effects on the synchronization of the system. Because of the small amount of time that each of the processing elements requires to extract information from the bus, the addition of extra processing elements into the ring adds only one extra clock cycle per added processing element, thus incurring minimal additional delay.

3. The Bus Interconnect

Referring still to FIG. 4, one function of bus segments 250, 252 and 254 is to transfer packets of information between processing elements 202, 222 and 242. According to one embodiment of the invention, a complete packet of information includes two distinct portions, with each portion comprising thirty-two bits of information. When transmitted, the two portions of each information packet are multiplexed in time so that, for each complete packet that is transferred, sixty-four bits of information actually are transferred between processing elements. For example, a first portion of an information packet might include a thirty-two bit address, and a second portion of the packet (immediately following the first portion) might include a thirty-two bit data word. Also according to this embodiment, each portion of each complete information packet has a nine bit type data field associated with it, and this nine bit type field is transmitted concurrently with the information packet with which it is associated.

Each of bus segments 250, 252 and 254 has forty-one bus lines dedicated to the transfer of information and type data. Using bus segment 250 as an example, bus lines 250F, which includes thirty-two distinct bus lines, is dedicated to the unidirectional transfer of thirty-two bits of information between interface circuit 206 and interface circuit 226, and bus lines 250E, which includes nine distinct bus lines, is dedicated to the unidirectional transfer of nine bits of type data between interface circuit 206 and interface circuit 226. Thus, during a single clock cycle, bus lines 250E and 250F, together, are able to transfer nine bits of type data and thirty-two bits of information between processing elements 202 and 222. Preferably, half-packets of information and type data (i.e., thirty-two bits of information and nine bits of type data) are transferred at a rate of at least 200 MHZ.

As shown in FIG. 4, each of bus segments 250, 252 and 254 provides common signals between the processing elements that it interconnects. Again using bus segment 250 as an example, these signals include a clock signal (CLK) transmitted along bus line 250A, a buffered information ready signal (B_Rdy) transmitted along bus line 250B, an unbuffered information ready signal (U_Rdy) transmitted along bus line 250C, a busy signal (Busy) transmitted along bus line 250D, type field signals (Type[8:0]) transmitted along bus lines 250E, and information field signals (Info [31:0]) transmitted along bus lines 250F. The clock signals (CLK), type field signals (Type[8:0]), and information field signals (Info[31:0]) are forwarded in a first, downstream direction from one processing element (such as processing element 202) to the next processing element (such as processing element 222) in the ring. The buffered information ready signals (B_Rdy) and unbuffered information ready signals (U_Rdy), as well as the busy signals (Busy), are provided in a reverse, upstream direction from a second processing element (such as processing element 222) to a first processing element (such as processing element 202) in the ring. Two of these "reverse-direction" signals, i.e., the B_Rdy and U_Rdy, are used to control the flow of information between the processing elements, as will be described in more detail below.

The busy signal is used to indicated whether or not any of the chips on the bus are busy. A register in the master processing element, which may be read by the host, keeps track of whether or not any of the chips are busy. In this manner, the host can determine when it is able to perform certain operations involving the processing elements.

One significant advantage of bus interconnect system 200 is its flexibility. That is, bus interconnect system 200 can interconnect any number of processing elements without a significant degradation in signal integrity or bandwidth, since, as noted above, the clock is transmitted with the data and only one load is coupled to each source. Thus, the bus architecture of the invention permits the addition of optional processing elements to perform functions such as texture mapping, image processing, volume rendering, or the addition of standard processing elements such as rasterizers or frame buffer controllers for increased performance and functionality.

Another advantage provided by the bus structure, is that by multiplexing (in time) two distinct, thirty-two bit information words, the number of pins required to exchange this information between the processing elements is one-half the number that would be required if the information packets were not so multiplexed. The speed of the bus, i.e. 200 MHZ, is high enough that the multiplexing of thirty-two bits of address and thirty bits of data in the manner described above may be performed while still allowing the graphics device to meet performance goals. Since pin reduction is generally a major factor in ASIC design, the ability of the bus structure to meet performance goals with one-half the number of pins dedicated to information transfer provides a significant advantage over systems that use larger numbers of pins to transmit the same amount of information.

As ASIC technology improves, however, and available pin counts increase, or should technological advances dictate the need for a faster data transfer rate, the 41 bit information path may easily be expanded such that more pins may then be dedicated to information transfer, and the bandwidth of the system may be increased accordingly. Also, improvements in PC board technology and I/O pad designs no doubt will allow bus architecture 200 to run at increased frequencies.

Additionally, as noted above, bus segments 250, 252, and 254 are unidirectional. Unidirectional buses generally provide a faster data transfer rate than bi-directional busses, since there is no delay period associated with reversing the direction of the bus. Further, because there is no need to provide for and control both a transmit and a receive path, unidirectional bus structures typically are easier to manage and require less hardware.

4. The Processing Elements

As mentioned above, each of the processing elements of FIG. 4 includes a core processor (e.g., core processor 224), a number of write and read FIFOs (e.g., FIFOs 228, 230, 232 and 234), and an interface circuit (e.g., interface circuit 226), and, as also mentioned above, the core processor of each processing element need not be the same. For example, in the embodiment of FIG. 4, core processor 204 of processing element 202 includes logic for interfacing with the host PCI bus, which need not be included in the other core processors. In the example of FIG. 4, processing element 202 is the master processing element in ring network 200, and thus, as mentioned previously, it could correspond to host interface 106 in FIG. 1–3. Thus, as described in more detail below, processing element 202 processes input packets in a slightly different manner than the other processing elements coupled in the ring.

The general operation of each of processing elements 202, 222 and 242 with regard to bus interconnect network 200 is as follows. A primary clock is divided into two phases, Phase 1 (P1) and Phase 2 (P2). As mentioned previously, packets that are communicated across the information lines (e.g., bus lines 250F) may be, for example, multiplexed address/data information, with each packet (in one exemplary embodiment) comprising thirty-two bits of address information and thirty-two bits of data information (for a total of sixty-four bits of information per packet). Thus, during Phase 1 (P1), an address portion of a packet may be transmitted over the information lines (e.g., bus lines 250F), and during Phase 2 (P2) the associated data portion of the packet may be transmitted over the information lines.

It should be noted at this juncture, however, that a packet of information need not comprise an address packet followed by a data packet, and may include any combination of address and data information. For example, as shown in Table II below, an information packet may comprise a data packet followed by another data packet when an operation such as a block transfer is performed. Further, it should be noted that a packet of information need not be multiplexed into two or more separate portions, and may alternatively be transmitted as a single multi-bit packet without departing from the intended scope of the invention.

Each packet of information is received by an interface circuit (e.g., interface circuit 226) via a set of information lines (e.g., bus lines 250F). All packets received by a processing element are forwarded to the core processor of that processing element (e.g., core processor 224 of processing element 222) for handling. Each processing element has a unique base address associated with it so that, for example, during a read operation, five bits of an incoming address may be compared with the base address of the processing element to see whether the packet is intended for that processing element. Preferably, all identical types of processing elements will share a common base address. If a particular packet does not concern a processing element, the core processor simply will drop the packet. Otherwise, the core processor will perform whatever function is dictated by the packet. If the packet is a read packet, for example, then the core processor (e.g., core processor 224) will forward information read from its memory (after a slight delay) out to the interface circuit associated with it (e.g., interface circuit 226) so that the interface circuit can forward the information to the downstream processing elements (e.g., processing element 242).

One reason that bus interconnect system 200 is able to operate at a high frequency is because each interface circuit, for each processing element (other than master processing element 202), holds information for only a minimal amount of time before passing it to the next processing element in the ring. That is, as information is transferred into each of processing elements 222 and 242, each of interface circuits 226 and 246, respectively, retrieves the information in an input register (not shown) during a first clock-cycle and forwards it to an output register (not shown) during a second clock cycle following the first clock cycle, which may be but is not necessarily the next succeeding clock-cycle. Thus, in one embodiment, there is only a one clock cycle latency incurred at each of processing elements 226 and 246. Thus, all packets received by a processing element (other than master processing element 202) are forwarded by its interface circuit to the next processing element in the ring.

In contrast, the master processing element, because it is the start and the end of the ring interconnect, is configured to act in "detour mode." In detour mode, interface circuit 206 operates as two distinct halves. An input half (including write FIFOs 208 and 210) receives all of the address/data information from the ring and detours the received information through core processor 204, and an output half (including read FIFOs 212 and 214) receives new address/data information from core processor 204 and forwards this information to the next processing element in the ring. Thus, in the example shown in FIG. 4, all information received by interface circuit 206 (in master processing element 202) enters core element 204, and information is never passed directly from the input of interface 206 to the output thereof, as is done in each of interface circuits 226 and 246. The output half is able to receive commands from the host processor (via the PCI bus), pass on or modify such commands (or create additional commands in response thereto), and forward these commands to the ring.

Although detour mode is described above as being used only for the master processing element, it is envisioned that it may be used for other processing elements in the ring as well to provide enhanced functionality. For example, detour mode also may be used in other processing elements to permit those elements to perform functions such as image processing. During image processing, data generally is fed into a core processor, manipulated, and passed out of the core processor. Thus, the data received by a core processor (when it is performing image processing) typically is stored and processed in such a manner that the latency between the entry and the exit of the data can be very long. In addition, a different amount of data may enter the core than the amount of data that exits it. Hence, by placing one or more of the processing elements in the ring in detour mode, image processing may be handled by those processing elements without degrading the overall performance of the ring.

Detour mode may also be used, for example, to allow a processing element to transmit a digital video stream to a video data processing element that is downstream from the transmitting processing element. The processing element(s) supplying the digital video stream always should be upstream from the video data processing element(s) receiving the digital video stream. To perform such a function, the host places the digital video data processing element into detour mode by writing to a detour state hardware register (not shown) in the interface of the digital video processing element. No other operations should be performed on the interconnect after placing the video processing element in detour mode. After being placed in detour mode, the video processing element then can generate writes to memory and overlay buffers, image buffers or texture caches in any of the downstream processing elements in the ring bus.

Detour mode is enabled by setting a detour state hardware flag at each "to-be-detoured" interface circuit. Thus, in the example shown in FIG. 4, the detour state hardware flag of interface circuit 206 is set permanently, while the detour state hardware flags of interface circuits 226 and 246 optionally may be set.

Since master processing element 202 (in FIG. 4) initiates information packet communication in the ring network, it also provides the primary clock that is forwarded with the information. That is, in addition to master processing element 202 being configured to act in detour mode, it also is configured to act in "master mode." All processing elements, regardless of whether or not they are configured to act in master mode, receive an incoming clock (In_CLK) from an upstream processing element along with information from that processing element. This incoming clock In_CLK is used to clock the input circuitry of the interface circuits (described below). Processing elements other the processing element 202, which are not configured to act in master mode, also use the incoming clock In_CLK to clock the output circuitry of the interface circuit (described below).

Because it is configured to act in master mode, interface circuit 206 is controlled such that its output circuitry is clocked using a source clock (Src_CLK) generated by core processor 204, rather than the incoming clock (In_CLK). The source clock Src_CLK from the core of a "mastered" processing element therefore is forwarded along with the information from the core of that processing element to the next processing element in the ring. The manner in which either the source clock or the incoming clock is selected to provide timing to the output circuitry of an interface circuit (depending on whether or not it is configured to act in master mode), as well as the generation of appropriate timing signals therefrom, is described in more detail below.

As mentioned above, the processing elements coupled to the master processing element generally do not operate in detour mode. Thus, for all non-master processing elements (e.g., processing elements 222 and 242), the forwarding of information from one processing element to another in the ring is controlled largely by the interface circuit of the processing element (e.g., interface circuits 226 and 246). Using non-master processing element 222 as an example, core processor 224 receives information via asynchronous buffered write (BW) and unbuffered write (UW) FIFOs 228 and 230, and passes information read from core processor 224 to the output of interface circuit 226 via asynchronous buffered read (BR) and unbuffered read (UR) FIFOs 232 and 234. FIFOs 228, 230, 232 and 234 are referred to as "asynchronous" because buffered write (BW) and unbuffered write (UW) FIFOs 228 and 230 receive information from interface circuit 226, and buffered read (BR) and unbuffered read (UR) FIFOs 232 and 234 transmit information to interface circuit 226 using a first clock (provided by interface circuit 226), while buffered write (BW) and unbuffered write (UW) FIFOs 228 and 230 transmit information to core processor 224, and buffered read (BR) and unbuffered read (UR) FIFOs 232 and 234 receive information from core processor 224 using a second clock (provided by core processor 224) that may have a different frequency than the first clock. Thus, because interface circuit 226 and core processor 224 may operate at different frequencies, the use of asynchronous FIFOs 228, 230, 232 and 234 facilitates the transferring of information between the two devices.

Still using processing element 222 as an example, in one embodiment, each of FIFOs 228, 230, 232 and 234 is capable of storing eighty-two bits (in parallel) per FIFO entry. The reason for employing both buffered FIFOs (i.e., non-priority interface storage elements) and unbuffered FIFOs (i.e., priority interface storage elements) in each of the write and read paths is described in more detail below. At this point, however, it should be noted that two distinct information paths, i.e., a buffered (non-priority) information path and an unbuffered (i.e., priority) information path are provided into and out of core processor 224. In one embodiment, forty-one of the eighty-two parallel bits stored in each entry of buffered write (BW) and unbuffered write (UW) FIFOs 228 and 230 correspond to the thirty-two information bits and nine type bits received during Phase 1 (P1) of the packet transmission, and the other forty-one of the bits correspond to the thirty-two information bits and nine type bits received during Phase 2 (P2) of the packet transmission. Thus, if a function requiring an address and data, such as a write function, is performed, then each buffer entry will include a thirty-two bit address, a nine-bit type field associated with the address, thirty-two bits of data, and a nine-bit type field associated with the data (which generally is a duplicate of the type field associated with the address). In one embodiment of the invention, each of buffered write (BW) and unbuffered write (UW) FIFOs 228 and 230 should be at least five entries deep, and each of the read FIFOs should be at least one entry deep. However, it should be understood that the number of entries in each FIFO may be adjusted as required by the core.

Figure 5:
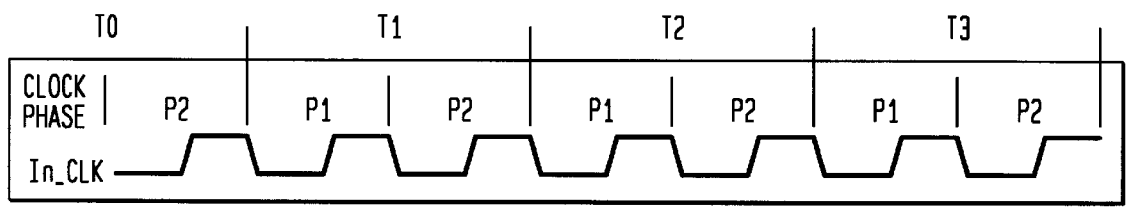
FIG. 5 is a timing diagram showing the phases of operation of the system clock used in the invention.

In one embodiment, the clock signal forwarded between each processing element is a 200 MHZ clock. Each interface circuit (e.g., interface circuit 226), uses a two-phase clocking system, each phase of which operates at one-half the external clock frequency. i.e., each phase operates at 100 MHZ in this embodiment. Referring now briefly to FIG. 5, a timing diagram is shown that illustrates the relationship between the incoming system clock In_CLK (from an upstream processing element) and two clocking phases phase 1 (P1) and phase 2 (P2) that are created internal to each of the interface circuits. Note that the phase of operation (i.e., P1 or P2) changes for each falling edge of the incoming system clock In_CLK. For timing reasons, it may be desirable to use a complementary system clock rather than the single-phase clock shown in FIG. 5. However, for the sake of simplicity, only a single-phase clock will be described hereinafter.

As mentioned above, when a processing element is not configured to act in master mode, it will transmit the incoming clock In_CLK as its outgoing clock (Out_CLK), which is transmitted with outgoing information. Thus, when not configured in master mode, the internally created phases P1 and P2 for the outgoing clock Out_CLK will be identical to the internally created phases P1 and P2 for the incoming In_CLK. When a processing element is configured to act in master mode, however, it will use a source clock Src_CLK from its core, rather than the incoming clock In_CLK, to transmit data. Therefore, when in master mode, an interface circuit will transmit a source clock as its outgoing clock Out_CLK, and, to control the flow of outgoing information, will generate a two-phase clocking system (also including phases P1 and P2) that is similar to (but not identical to) that shown in FIG. 5.

Referring now to FIG. 6, a detailed block diagram of interface circuit 226 is shown. Since, in one embodiment, the interface circuits of all of the processing elements in the ring are identical, the following description of interface circuit 226 should be understood as applying to each of interface circuits 206 and 246 as well. As noted previously, however, interface circuit 206 generally only operates in "detour mode" and "master mode," so its operation will differ slightly from that of interface circuits 226 and 246.

As shown in FIG. 6, type data and multiplexed packets of information are provided concurrently to the input of interface circuit 226 and are latched into an input register 260 (i.e., an input storage element). Input register 260 may be included in the input pads of interface circuit 226, or may alternatively be located external to the interface circuit. As mentioned above, the logic in interface circuit 226 is clocked using a two-phase clocking system. The incoming clock In_CLK is provided to the input of a divide-by-two circuit 295, which provides output signals write clock (Wr_CLK) and phase 2 clock (P2_CLK), which is the inverse of the Wr_CLK signal and, thus, is high during phase P2. The signals Wr_CLK and P2_CLK are used to control various registers in the interface logic, as described below.

The incoming clock In_CLK also is provided to one input of multiplexer 299. Multiplexer 299 also receives a source clock Src_CLK from core processor 224 as a second input. When interface circuit 224 is configured to act in master mode, multiplexer 299 will select the source clock Src_CLK as its output, and will provide the source clock Src_CLK as the output clock Out_CLK to the output of interface circuit 226. Conversely, when the interface circuit is not configured to act in master mode, multiplexer 299 will select the input clock In_CLK as its output, and will provide the input clock In_CLK as the output clock Out_CLK.

The output of multiplexer 299 also is provided to the input of a divide-by-two circuit 297, which provides a read clock RD_CLK, as well as a signal (not shown) that is the inverse of RD_CLK and is used for output control, at its output. Thus, when interface circuit 226 is not configured in master mode, write clock Wr_CLK and read clock RD_CLK should be synchronous, and both should be the inverse of P2_CLK. Conversely, when interface circuit 226 is configured in master mode, the read clock RD_CLK will be driven solely by the source clock Src_CLK.

According to one embodiment, the clocks created by divide-by-two circuits 295 and 297 may be synchronized system-wide by toggling the state of a single bit of information on one of the information bus lines, e.g., Bit[31] of bus lines 250F (shown in FIG. 4), and synchronizing the outputs of divide-by-two circuits 295 and 297 thereto.

By using a pass through path 261 coupled (via multiplexers 270 and 282) between input register 260 and an output register 300 (i.e., an output storage element), interface circuit 226 is able to quickly forward information packets (and type data) through its circuitry into output register 300 for transmission to the next processing element. Pass through path 261 is used whenever backup path 290 (described below) is empty and the downstream processing element (not shown) provides a signal to interface circuit 226 indicating that it presently is capable of receiving information. However, if the downstream processing element indicates that it is not able to receive information, the information that would have been passed to the downstream element (had it been ready to receive the information) is stored in information storage elements (e.g., registers) within a backup information path 290 (described below). This backed up information must be stored in information storage elements of backup information path 290 at least until interface circuit 226 stops receiving information from an upstream processing element (e.g., processing element 202 in FIG. 4). The upstream processing element will stop transmitting this information in response to interface circuit 226 providing a signal to the upstream processing element instructing it to halt its transmission of information.

5. Communication Protocol

In the embodiment described herein, as noted above, information packets transferred between processing elements comprise two portions. For example, the first portion may comprise address information and the second portion may comprise data associated with that address. In addition, associated with each of the two portions of an information packet is a type field. In one embodiment, the type field includes nine bits, and may be encoded as shown below in Table I:

TABLE I

| Type <8:0> | 8 | 7:5 | 4 | 3 | 2 | 1 | 0 |
|---|---|---|---|---|---|---|---|
| Register Read/Wr | Valid | 000 | 0 | Unbuff | Privlgd | 0 | Rd/~Wr |
| BIN Read/Wr | Valid | 001 | 0 | Unbuff | 0 | 0 | Rd/~Wr |
| Block Transfer | Valid | 010 | 0 | 0 | 0 | StepY/~X | Dec/~Inc |
| Plane Equations | Valid | | <7> = 1, <6:0> Plane Equations | | | | |
| Misc | Valid | 011 | 0 | Unbuff | 0 | 0 | 0 |

The type field is used to provide instruction to each of the processing elements regarding what to do with the information it receives concurrently therewith. Two type fields that are commonly used are the Register Read and Register Write type fields. A Register Write is performed in two steps. First the address is sent over the bus during Phase 1 (P1) and, second, data is sent during Phase 2 (P2). For Register Reads, the address is sent during Phase 1 (P1), and the data field, sent during Phase 2 (P2), is unknown. After a brief delay, the data read from the core processor is inserted into the previously unknown data slot of the same register read packet and is forwarded to the next processing element in the ring.

Two other commonly used type fields are BIN Read and BIN Write instructions, which are for reading and writing BIN type data (i.e., reading and writing information to specific buffers such as overlay buffers, image buffers or texture caches). As another type field option, Block Transfer instructions may be used to transfer large blocks of data between a source and a destination. For example, a large block of data could be transferred from the host computer (via the master processing element) to a downstream processing element by using Direct Memory Access (DMA) techniques. Additionally, Plane Equation instructions may be included in the type field to transfer plane equation data to registers for 3D rendering. Finally, Miscellaneous (Misc) type instructions are used to implement special functions on the bus. For example, the Misc type instruction could be used to flush a read path prior to performing any other type of operation.

As is evident from Table I, some instructions share bits with common meanings. For example, Bit<8> of the type field is a "Valid" bit, which is used to indicate the validity of each of the portions of an information packet. If the Valid bit is a '0', bits <7:0> of the type field are ignored. Additionally Bit <3> of the type field typically is used to identify whether a buffered (i.e., non-priority) information path or an unbuffered (i.e., priority) information path should be used to: (1) transfer information from the interface circuit to the core processor, (2) transfer information from the core processor to the interface circuit, or (3) hold information in the backup information path (described above). More details on buffered and unbuffered information paths will be provided below.

As mentioned previously, information is transmitted on the bus in multiplexed packets, with one half of each information packet being transferred on each phase of the clock. Table II below summarizes the information that is transferred during Phases 1 and 2 (P1 and P2) for the types of operations described above and listed in Table I:

TABLE II

| Operation | Phase I | Phase II |
|---|---|---|
| Register Write | Address | Write Data |
| Register Read | Address | Read Data |
| BIN Write | Address | Write Data |
| BIN Read | — | Read Data |
| Block Transfer | Source Data | Destination Data |
| Misc | — | — |
| Plane Equations | Address/Data | Address/Data |

Referring to FIGS. 4 and 6 (and again using processing element 222 as an example), as shown in Table II, the first portion of each information packet is received by interface circuit 226 (on information lines 250F) during phase P1 and the second portion of each packet is received by interface circuit 226 (also on information lines 250F) during phase P2. As shown in FIG. 6, interface circuit 226 includes an input register 260, a P1 register 262, a P1 WD register 264 and a P2WD register 266. Input register 260 receives incoming information packets (and their associated type data), and P1 register 262 receives its input from the output of input register 260. Additionally, P1 WD register 264 receives its input from the output of P1 register 262, and P2WD register receives its input from the output of input register 260.

Figure 7:
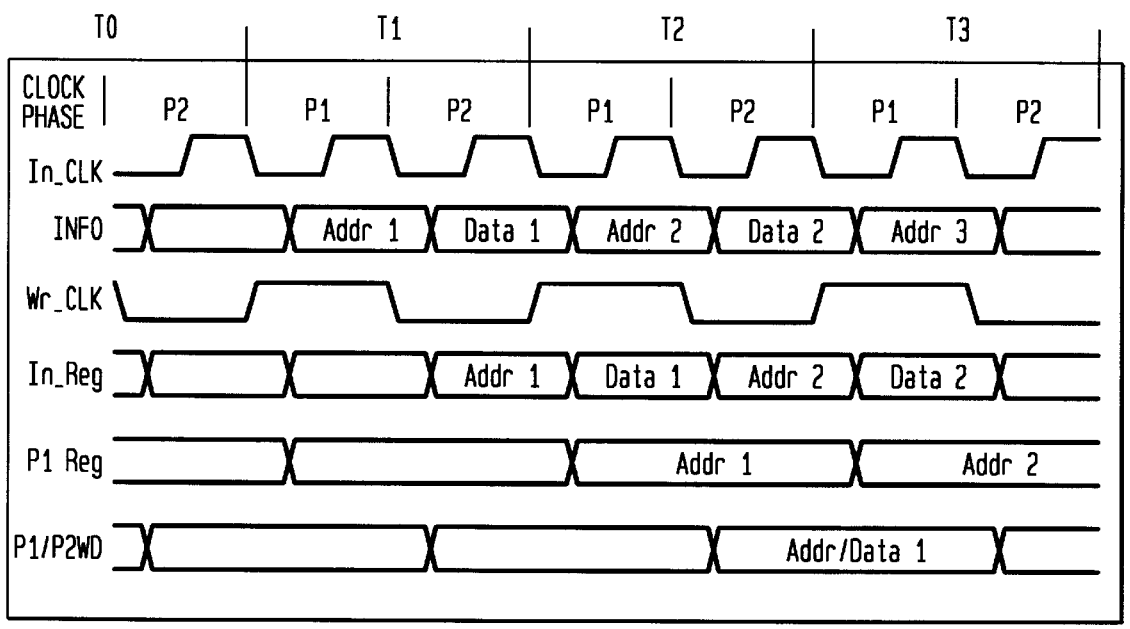
FIG. 7 is a timing diagram showing how address and data information may be clocked into various registers employed in the interface circuit shown in FIG. 6.

Referring now briefly to FIG. 7, a timing diagram is shown that illustrates the receipt of several complete information packets by interface circuit 226. In particular, this timing diagram illustrates: (1) the state of the incoming clock (In_CLK) received on bus line 250A, (2) the information (Info[31:0]) received on bus lines 250F, (3) the write clock signal (Wr_CLK) output from divide-by-two circuit 295, and (4) the contents of input register 260 (IN_Reg), P1 Register 262 (P1_Reg) and P1WD and P2WD registers 264 and 266, respectively (P1/P2WD). The states of the foregoing signals are illustrated over a series of transfer cycles T0–T3, with each of transfer cycles T0–T3 including a first phase P1 and a second phase P2. These signals are shown on the same time scale (horizontal axis) for comparison. The physical placement of one signal above another does not denote that one attains a higher magnitude than the other signals.

Because one embodiment of the invention described herein is implemented using ASICs as the processing elements, the control of the "next-state" contents of each of the individual information storage elements shown in FIG. 6 (i.e., what the contents of the information storage elements will be during the next clocked state), as well as the control of the flow of information through the various multiplexers, may be implemented by using a software simulation language such as Verilog, and then converted into a logic gate circuit by a synthesis tool such as Synopsys™ operating on a general purpose processor. The logical functions alternatively may be written in software and performed by a processor.

As shown in FIG. 7, during phase P1 of transfer cycle T1, an output register of an upstream processing element forwards, for example, address ADDR1 (i.e., an address portion of a first information packet) over the bus lines 250F. During phase P2 of transfer cycle T1, the falling edge of incoming, clock In_CLK latches ADDR1 into input register 260 of interface circuit 226. During phase P1 of time T2, the falling edge of incoming clock In_CLK latches the data portion DATA1 of the first information packet into input register 260. This leaves input register 260 and interface circuit 226 free to receive ADDR2 from an upstream processing element on the next falling edge of incoming clock In_CLK (i.e., during phase 2 (P2) of time T2). Type data is received by interface circuit 226 (from bus lines 250E) in an identical manner. Thus, information and type data is received by interface circuit 226 at the frequency of the incoming clock In_CLK, i.e., at approximately 200 MHZ.

To de-multiplex the two portions of each information packet into an eighty-two bit parallel word (to be passed to core processor 224), phase P1 register 262 is provided. As the information (and associated type fields) are received by interface circuit 226 as described above, P1 register 262 is controlled by one-half frequency clock Wr_CLK so as to latch only the first portion of each information packet. Also, P1/P2WD registers 264/266 (for forwarding information to core processor 224) are controlled by one-half frequency clock P2_CLK (which is the inverse of one-half frequency clock Wr_CLK) so as to simultaneously latch both portions of each information packet.

More specifically, during the rising edge of one-half frequency clock Wr_CLK, the contents of input register 260 is latched into P1 register 262 and, during the rising edge of one-half frequency clock P2_CLK (which is falling edge of Wr_CLK), the contents of P1 register 262 is latched into P1WD register 264 and the contents of input register 260 is latched into P2WD register 266. Thus, after the rising edge of any P2_CLK signal, the P1/P2WD registers 264 and 266 store, respectively, the first portion and second portion of an information packet. At any time before the next rising edge of the P2_CLK signal, (for example, on the rising edge of the next Wr_CLK signal) the information in the P1/P2WD registers is loaded into either the buffered (i.e., non-priority) asynchronous write (BW) FIFO 228 or the unbuffered (i.e., priority) asynchronous write (UW) FIFO 230, depending on the values of certain bits in the type fields associated with the packet, as will be explained in more detail below. There is no filtering of address/data and type information provided by the interface. Thus, every information packet that is received at the interface is forwarded to core processor 224, which determines whether or not it is a packet of interest.

Referring back to FIG. 6, all incoming multiplexed packets of information is received by input register 260 on each falling edge of the incoming clock In_CLK (as noted above), and information from either: (1) input register 260 (via pass through path 261), (2) backup information path 290, or (3) buffered read (BR) or unbuffered read (UR) FIFOs 232 or 234, is clocked into output register 300 (via one or more of multiplexers 270, 282 and 280) on the falling edges of output clock Out_CLK (which is the same as input clock In_CLK when processing element is not in master configuration) as well. Therefore, when not configured in master mode, input register 260 and output register 300 receive and transmit information on each falling edge of input clock In_CLK, i.e., during both the P1 and P2 transfer cycles. Because information packets are multiplexed into two portions (e.g., an address portion and a data portion), input register 260 actually receives the first portion of each information packet, e.g., the address information, on the falling edge of input clock In_CLK during a P2 phase of operation, and receives the second portion of the information packet, e.g., the data information, on the falling edge of input clock In_CLK during a P1 phase of operation (that immediately follows the P2 phase during which the address was clocked into register 260). Similarly, the first portion of each information packet that is transmitted by interface circuit 226 is clocked into output register 300 by a falling edge of output clock Out_CLK (which is the same as input clock IN_CLK when processing element is not in master configuration) during a P1 phase of operation, and the second portion of each transmitted information packet is clocked into output register 300 by a falling edge of output clock Out_CLK during a phase P2 of operation (that immediately follows the P1 phase during which first portion of the packet was clocked into register 300).

When the processing element downstream from processing element 222 (e.g., processing element 242) indicates that it is capable of receiving information from processing element 222, and processing element 222 is not itself stalled (e.g., when waiting for read information from its core processor), output register 300 will receive information directly from input register 260 (via pass through path 261) so that one portion of an information packet (and its associated type data) is shifted through interface circuit 226 during each falling edge of input clock In_CLK and a latency of only a single clock cycle is incurred as a result of the presence of the interface circuit.

6. The Backup Information Paths

If the processing element downstream from processing element 222 (e.g., processing element 242) indicates that it presently is not capable of receiving information from processing element 222, or if processing element 222 is itself stalled (e.g., when waiting for read information from its core), then information storage elements within backup information path 290 (described below) are used to store information that gets backed up in interface circuit 226 while the processing element that is upstream from processing element 222 (e.g., processing element 202) is still sending data, i.e., until upstream processing element 202 responds to an indication from processing element 222 that it currently is unable to accept information. That is, this backup function is performed at least until interface circuit 226 is able to signal to the upstream processing element (e.g., processing element 202) to stop sending information.

As shown in FIG. 6, backup information path 290 includes a buffered (i.e., non-priority) information backup path 292 and an unbuffered (i.e., priority) information backup path 294. Buffered information backup path 292, in turn, includes buffered (i.e., non-priority) backup storage elements B0, B1, B2, B3, B4 and B5, and unbuffered information backup path 294 includes unbuffered (i.e., priority) backup storage elements U0, U1, U2, U3, U4 and U5. Also included in backup information path 290 are multiplexers 292A and 292B, which, in one embodiment, are arranged to selectively provide the contents of only one (or none) of buffered backup storage elements B4 and B5 and unbuffered backup storage elements U4 and U5 to one of the inputs of multiplexer 270 to which the outputs of multiplexers 292A and 292B are connected.

Also shown in FIG. 6 are B_Rdy register 322, U_Rdy register 324, B_Rdy logic circuit 326 and U_Rdy logic circuit 328. B_Rdy register 322 receives an incoming buffered ready (B_Rdy_In) signal from a downstream processing element (via B_Rdy logic circuit 326), and provides an outgoing buffered ready (B_Rdy_Out) signal to an upstream processing element. Similarly, U_Rdy register 324 receives an incoming unbuffered ready (U_Rdy_In) signal from a downstream processing element (via U_Rdy logic circuit 328), and provides an outgoing unbuffered ready (U_Rdy_Out) signal to an upstream processing element. B_Rdy and U_Rdy logic circuits 326 and 328 receive a number of other inputs in addition to the incoming B_Rdy_In and U_Rdy_In signals, any of which may indicate the present inability of processing element 222 to receive information from an upstream processing element. Each of B_Rdy and U_Rdy registers 322 and 324 is clocked on the rising edge of the Wr_CLK signal.

Downstream processing elements signal upstream processing elements to halt information transmission simply by de-asserting their outgoing buffered ready (B_Rdy_Out) signals (e.g., on bus line 250B) or their outgoing unbuffered ready (U_Rdy_Out) signals (e.g., on bus line 250C) to the upstream element. The B_Rdy_Out and U_Rdy_Out signals indicate the relative ability of processing element 222 to receive buffered (i.e., non-priority) information and unbuffered (i.e., priority) information. More explanation regarding the use and control of buffered and unbuffered information will be provided in detail below.

Backup information path 290 in FIG. 6 includes three stages of buffering in each of its buffered and unbuffered information paths 292 and 294 to accommodate the maximum amount of information that might be backed up, for example, between the time that interface circuit 226 first receives an incoming de-asserted B_Rdy_In signal from downstream interface circuit 246 and the time that interface circuit 226 actually stops receiving information from upstream interface circuit 206 (after interface circuit 226 has de-asserted its outgoing buffered ready signal B_Rdy_Out to upstream interface circuit 206).

The receipt of either the incoming B_Rdy_In or the U_Rdy_In signal by interface circuit 226 (from a downstream processing element) will cause interface circuit 226 to halt transmission of information of the identified type (i.e., either buffered or unbuffered information) to the downstream processing element and to store any pending information, as well as any information received during the time between when interface circuit 226 de-asserts its outgoing B_Rdy_Out or U_Rdy_Out signal (to an upstream processing element) and the time when the upstream processing element actually stops sending information of the identified type, into dedicated buffers included backup information path 290. Thus, the receipt of a de-asserted incoming B_Rdy_In or U_Rdy_In signal is an indication that the processing element receiving the signal should stop sending information and type data (as soon as possible) on its outgoing information and type data bus lines.

Once interface circuit 226 receives a de-asserted B_Rdy_In or U_Rdy_In signal from a downstream processing element, it will halt its information transfer only after it is through sending any complete packet of information that it already had started to send when it received the signal. Thus, for example, if interface circuit 226 receives a de-asserted B_Rdy_In signal from interface circuit 246 just after an address (associated with a non-priority operation) has been clocked into output register 300, interface circuit 226 will proceed to clock the data portion of the information packet (associated with the previously sent address) before halting information transfer to downstream processing element 246.

It should be noted that the information that is transferred to backup path 290 also is latched into P1WD register 264 and P2WD register 266 and is transferred to either buffered write (BW) FIFO 228 or unbuffered write (UW) FIFO 230 (depending on whether the information is buffered or unbuffered), so that even the "backed up" information will reach core 224 (in case the information concerns the core).

For the sake of simplicity, the description below will refer only to the use and effects of the B_Rdy_In and B_Rdy_Out signals and the use of buffered backup information path 292, although it should be understood that the methods used for temporary storage of backed up information are identical for both buffered and unbuffered information.

When information (and type data) is transferred into buffered backup path 292, it is written first into registers B4 and B5. Once registers B4 and B5 are full, incoming information (and type data) then is written to registers B2 and B3. Finally, when, registers B2 and B3 are full, incoming information (and type data) is written to registers B0 and B1. Additionally, when information (and type data) is transferred into buffered backup path 292, the information (and type data) from P1 register 262 always is written to one of registers B0, B2 or B4, and information from input register 260 always is written to one of registers B1, B3 or B5. Although the information transfer paths from P1 register 262 to buffered backup storage elements B2 and B4, and from input register 260 to buffered backup storage elements B3 and B5 are not shown explicitly in FIG. 6, it should be understood that such information transfer paths nevertheless exist and the inputs to buffered backup path 292 are intended to represent inputs to each pair of buffered backup storage elements (i.e., B0 and B1, B2 and B3, and B4 and B5) in buffered backup path 292.

In contrast to how buffered backup path 292 is filled, when buffered backup path 292 is emptied, information (and type data) always is read from registers B4 and B5. Additionally, when registers B4 and B5 are emptied, the contents (if any) of registers B2 and B3 is shifted to registers B4 and B5, respectively, and the contents (if any) of registers B0 and B1 is shifted to registers B2 and B3, respectively.

As noted previously, software designed/hardware implemented logic may be used to control the next-state contents of each of the registers used in the invention. According to one embodiment, instead of examining the contents of each of the individual registers in backup information path 290 that contains type data, as well as the individual type-data registers in P2 register 262, to determine which information should be transferred to which location in the circuit during the next clock cycle, a number of separate, single-bit registers (i.e., contents-identifying storage elements), e.g., registers 302, 304, 306, 308, 310, 312 and 314, included in control register block 320 are utilized to keep track of what type of information is in which locations in backup information path 290, as well as what type of information is in P1 register 262. For example: (1) individual register 302 may be used to indicate whether buffered backup registers B4 and B5 are full, (2) individual register 304 may be used to indicate whether buffered backup registers B2 and B3 are full, (3) individual register 306 may be used to indicate whether buffered backup registers B0 and B1 are full, (4) individual register 308 may be used to indicate whether buffered backup register B0 has information of the miscellaneous type stored in it, (5) individual register 310 may be used to indicate whether buffered backup register B2 has information of the miscellaneous type stored in it, (6) individual register 312 may be used to indicate whether buffered backup register B4 has information of the miscellaneous type stored in it, and (7) individual register 314 may be used to indicate whether P1 register 262 has buffered information of the miscellaneous type stored in it. The use of these single-bit registers simplifies the control of the circuit and permits the circuit to operate at a higher speed than it might otherwise be able to operate.

Similar registers (not shown) also are provided in control register block 320 to indicate whether each of backup registers B0, B2 and B4, as well as P1 register 262, has other specific kinds of information stored in it, such as an address that matches the base address of the core of that processing element, an address of BIN read packet, or a Block Transfer ( BltOb) packet, as defined in table I above. Similar information also is stored in additional single-bit registers (not shown) in control register block 320 (i.e., contents-identifying storage elements) to identify the contents of the unbuffered (i.e., priority) backup storage elements, e.g., registers, included in unbuffered backup path 294. Additionally, single-bit "type-identifying" registers (not shown) in control register block 320 are used to identify whether P1 register 262 contains certain types of buffered information, e.g., buffered BltOb information, than are used to identify whether it contains certain types of unbuffered information, e.g., unbuffered BltOb information.

The B_Rdy_Out signal has two states; an asserted state, indicating that the processing element transmitting the B_Rdy_Out signal is available to accept information, and an un-asserted state, indicating that the processing element is unavailable to accept information. In one embodiment, the asserted state corresponds to a logic "1" and the de-asserted state corresponds to a logic "0".

In addition to a processing element de-asserting its outgoing B_Rdy_Out signal to an upstream processing element in response to receiving a de-asserted incoming B_Rdy_In signal from a downstream processing element, a processing element may be unable to accept information for a variety of other reasons. For example, if buffered write (BW) FIFO 228 (i.e., a non-priority information storage element) becomes within a certain number of entries of being full (as explained in more detail below), then, because interface circuit 226 cannot receive much more information, B_Rdy logic circuit 326 will cause the outgoing B_Rdy_Out signal to be de-asserted (on the next Wr_CLK) to halt the upstream processing element from transmitting information, thus insuring that input information does not get dropped. Also, during a core read operation, if read data is not already present (for example, due to a pre-fetch operation), B_Rdy logic circuit 326 will cause the outgoing B_Rdy_Out signal to be de-asserted (on the next Wr_CLK) when an incoming information packet is encoded to perform a read operation from core 224. Such a read operation may include a read of one or more core registers, or a read of a memory device (such as a frame buffer) coupled to the core.

When a read packet (e.g., a register read packet) is received when no pre-fetched data is present, processing element 222 is receiving an indication that it should stop sending information and type data (as soon as possible) to the downstream processing element. That is, a read packet being received by processing element 222 constitutes an indication that processing element 222 (in addition to signaling the upstream processing element to stop sending information) currently should stop sending information and type data (as soon as possible) to the downstream processing element insofar as processing element 222 must wait for information to be read from its core before that information (multiplexed with the previously received address) may be transmitted to the downstream processing element.

As mentioned above, when a read of core data is requested, there is a slight delay period, as core processor 224 is accessed, before the read data is returned. Data is read from the core via either buffered read (BR) FIFO 232 (i.e., a non-priority interface input storage element) or unbuffered read (UR) FIFO 234 (i.e., a priority interface input storage element), depending on whether the data is buffered or unbuffered, as explained below. Data from these FIFOs then is read into one of four information holding registers, i.e., information holding registers P1_OUT, P2_OUT, U_P1_OUT and U_P2_OUT (272, 274, 276 and 278, respectively). Again, for the sake of simplicity, only the reading of buffered data is described below, but it should be understood that the reading of unbuffered data is performed in the same manner (although using different registers).

During the delay period when core processor 224 is being accessed, the address of the read is stored in an information storage element within backup information path 290 and processing element 224 de-asserts its outgoing B_Rdy_Out signal on bus line 250B to signal the upstream processing element to stop sending information. When the data is returned from core processor 224, it propagates through buffered read (BR) FIFO 232 and is stored in P2_OUT register 274. Once the retrieved data is stored in P2_OUT register 274, the B_Rdy_Out signal is re-asserted (indicating that the upstream processing element may again send information), the address corresponding to the read is forwarded through multiplexers 292A, 270 and 282, and is output on the rising edge of the next P2_CLK signal. The retrieved data (after propagating through multiplexers 280 and 282) then is output on the rising edge of the next RD_CLK signal. Thus, when performing a core read, the B_Rdy_Out signal may be used to temporarily halt upstream processing elements until read data is available. Resultingly, after the core read is performed, the address and the data retrieved from that address, may be transmitted synchronously with a delay period determined (essentially) only by the delay associated with the core read operation.

Figure 8:
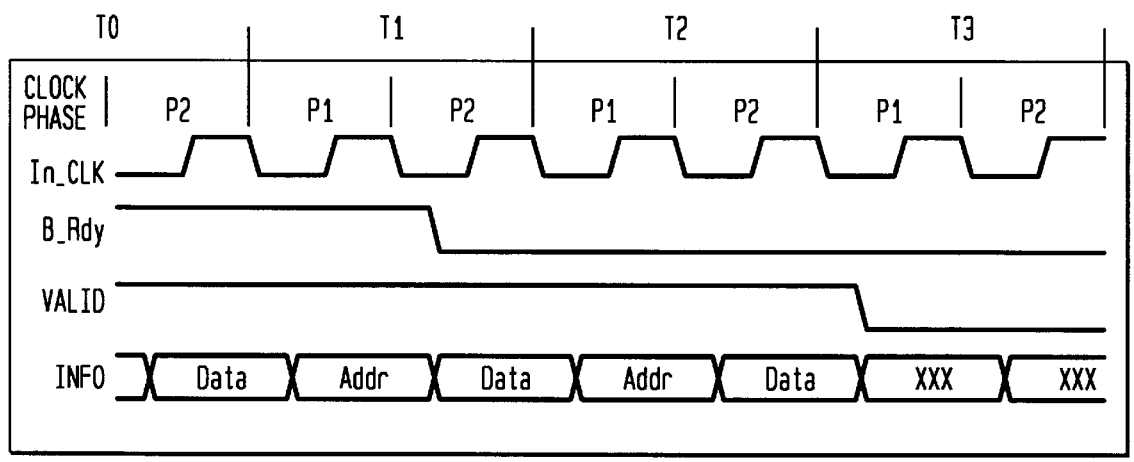
FIG. 8 is a timing diagram showing the delay between when an interface circuit de-asserts its Buffered_Ready signal to an upstream processing element and when the upstream processing element stops sending data to the interface circuit.

Referring now to FIG. 8, a timing diagram is provided that illustrates the time latency that is incurred between when the outgoing B_Rdy_Out signal is de-asserted by processing element 222 after it has received, for example, a core read packet, and when processing element 222 actually stops receiving information from an upstream processing element (e.g., processing element 202). These signals are shown on the same time scale (horizontal axis) for comparison. The physical placement of one signal above another does not denote that one attains a higher magnitude than the other signals.

As shown, during phase 1 (P1) and phase 2 (P2) of each transfer cycle, address and data information, respectively, are received on bus lines 250F. If the type information associated with an address sent during phase P1 of transfer cycle T1 indicates that a core read operation is to be performed, then during phase P2 of transfer cycle T1, the B_Rdy_Out signal is de-asserted. As is indicated by the high state of Bit<8> of the type field (i.e., the Valid signal), valid address and data information continue to be received on the bus lines 250F until the end of transfer cycle T2. The time delay between when the B_Rdy_Out signal is de-asserted during transfer cycle T1, and when information stops being transmitted on the bus during transfer cycle T2 results in a backup of information at processing element 222.

Figure 9:
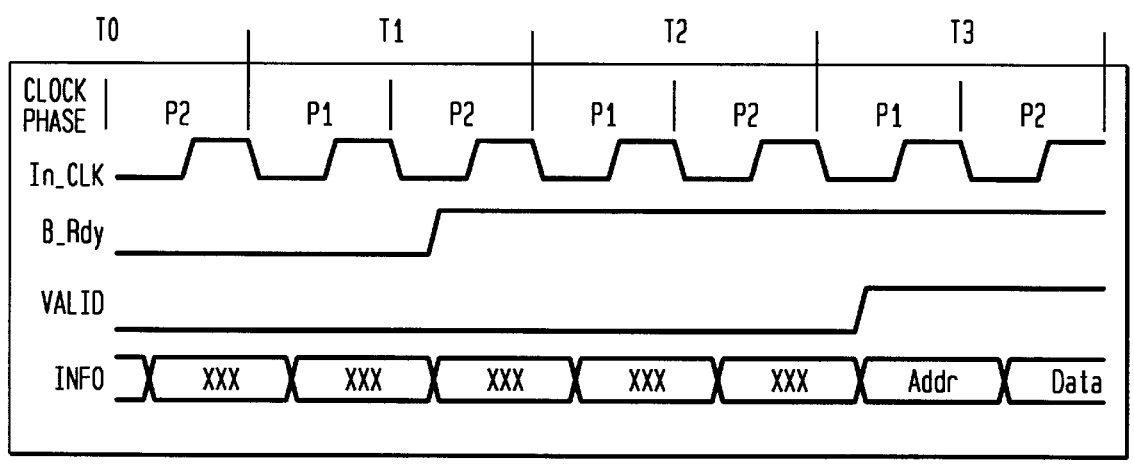
FIG. 9 is a timing diagram showing the delay between when an interface circuit re-asserts its Buffered_Ready signal to an upstream processing element and when the upstream processing element begins sending valid data to the interface circuit.

Referring now to FIG. 9, a similar delay is illustrated between the time when the B_Rdy_Out signal is re-asserted by processing element 222 and the time when processing element 222 again receives valid information from an upstream processing element (e.g., processing element 202). These signals are shown on the same time scale (horizontal axis) for comparison. The physical placement of one signal above another does not denote that one attains a higher magnitude than the other signals. This time delay allows for information in backup information path 290 to be forwarded out of output register 300 before new information is received by input register 260 of interface circuit 226.

Referring again to FIG. 6, the operation of interface circuit 226 after it has received an incoming B_Rdy_In signal (from a downstream processing element) that has been de-asserted now will be described. A first portion of an incoming information packet (e.g., address and address type information) is received at the input of input register 260 during phase P1 of a transfer cycle. During phase P2 of the same transfer cycle, the first portion of the information packet is latched into input register 260. During phase P1 of the next transfer cycle, the information stored in input register 260 is loaded into P1 register 262 at the same time that a second portion of the information packet (e.g., data and data type information) is loaded into input register 260. Both portions of information then are forwarded to the first stage of buffered backup path 292 (i.e., registers B4 and B5) on the succeeding P2 clock phase. Information continues to be transferred from P1 register 262 and input register 260 into succeeding registers (i.e., buffered backup storage elements) in buffered backup path 292 (on succeeding P2 clock phases) until the upstream processor stops transmission in response to interface circuit 226 de-asserting its outgoing B_Rdy_Out signal.

When interface circuit 226 again is ready to receive and/or send information, its outgoing B_Rdy_Out signal is asserted, and the process of emptying the registers in buffered backup path 292 begins. During Phase 1 (P1) of the first transfer cycle after the outgoing B_Rdy_Out signal has been re-asserted, information from register B4 is forwarded through multiplexers 292A, 270 and 282, and latched into output register 300. During Phase 2 (P2) of the same transfer cycle, information from register B5 is forwarded through multiplexers 292A, 270 and 282, and latched into output register 300.

During Phase 1 (P1) and Phase 2 (P2) of the second transfer cycle, information from registers B4 and B5, respectively, which (if present) has been shifted from registers B2 and B3, is forwarded to output register 300. Next, during Phase 1 (P1) of the third transfer cycle, information from register B4, which (if present) has been shifted from register B0 to register B2 during the first transfer cycle and from register B2 to register B4 during the second transfer cycle, is forwarded through the multiplexers to output register 300. Also during Phase 1 (P1) of the third transfer cycle, an upstream processing element (e.g., processing element 202) provides a first portion of an information packet onto bus 250. Thus, during Phase 2 (P2) of the third transfer cycle, the first portion of the information packet from the upstream processing element is latched into input register 260 at the same time that information from register B5, which (if present) has been shifted from register B1 to register B3 during the first transfer cycle and from register B3 to register B5 during the second transfer cycle, is latched into output register 300, thereby emptying buffered backup path 292.

Finally, during Phase 1 (P1) of the fourth transfer cycle, the second portion of the information packet from the upstream processing element can be latched into input register 260 at the same time that the first portion of the information packet (that was previously latched into input register 260) can be forwarded directly to output register 300 via pass-through path 261. Because buffered backup path 292 is sized so as to accommodate the maximum amount of information that possibly could be backed up therein, no information is lost when a processing element halts operation and high speed communication throughput is maintained.

7. The Buffered and Unbuffered Information Paths

Referring still to FIG. 6, as explained above, the first and second portions of each incoming information packet (as well as its associated type field) are latched, respectively, into P1 register 262 and input register 260 (i.e., an input storage element) prior to being latched, respectively, into P2WD register 266 and P1WD register 264, and forwarded to core processor 224 of processing element 222. Both portions of each information packet latched into P1WD and P2WD registers 264 and 266 are input into either buffered write (BW) FIFO 228 (i.e., a non-priority interface output storage element) or unbuffered write (UW) FIFO 230 (i.e., a priority interface output storage element), depending on the contents of the type field of the first portion of the packet. That is, the type field of the first portion of the packet, i.e., the portion stored in P1 register 262, is examined to determine whether the packet, according to the listings in Table I is identified as being buffered or unbuffered.

As is shown in Table I, if Bit <7> of this type field is a "1", then the packet always should be transferred to buffered write (BW) FIFO 228, and if Bit <7> is a "0", then whether the packet is transferred to buffered write (BW) FIFO 228 or unbuffered write (UW) FIFO 230 depends on the value of Bit <3> of the type field. In one embodiment, if Bit <3> of the type field of the first portion of a packet is a "1", then the information is of the unbuffered type and, conversely, if Bit <3> is a "0", then the information is of the buffered type.

According to one embodiment, rather than examining contents of the type field of P1 register 262 to determine whether it contains buffered or unbuffered information, two separate single-bit registers (e.g., registers 316 and 318 in control register block 320) are employed to keep track of whether P1 register 262 currently contains buffered or unbuffered information. For example, register 316 may be used to indicate whether P1 register 262 presently contains buffered information, and register 318 may be used to indicate whether P1 register 262 presently contains unbuffered information. The next-state contents of each of registers 316 and 318 may be determined by examining the type field of the information stored in input register 260, so that P1 register 262 will receive input information and registers 316 and 318 will receive inputs corresponding to the type of information input to P1 register 262 during the same clock cycle.

Figure 10:
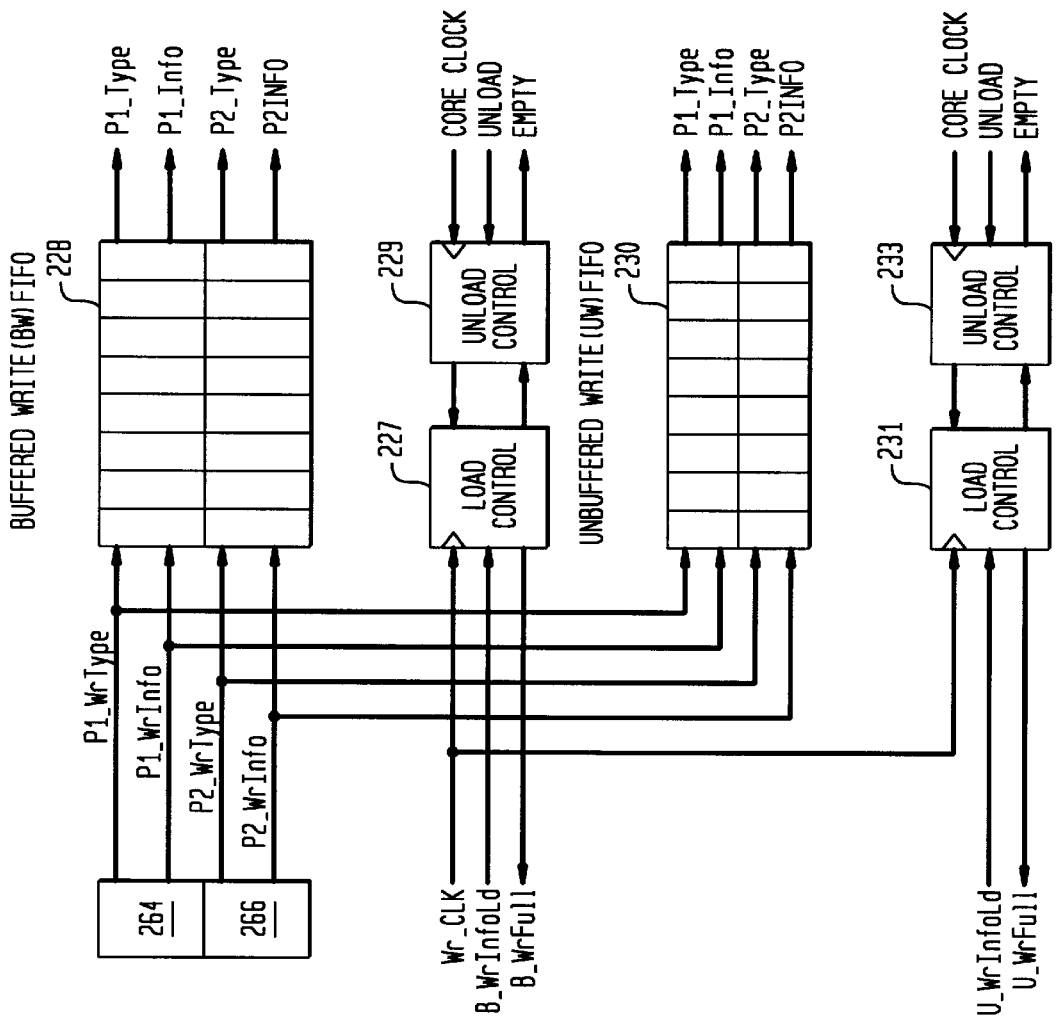
FIG. 10 is a more detailed block diagram of the buffered and unbuffered write FIFOs shown in FIG. 6.

Buffered write (BW) FIFO 228 and unbuffered write (UW) FIFO 230 are shown in more detail in FIG. 10. As shown, in one embodiment, each of buffered write (BW) and unbuffered write (UW) FIFOs 228 and 230 includes eight entries to store each of the two portions of an information packet. That is, each of buffered write (BW) and unbuffered write (UW) FIFOs 228 and 230 includes eight entries to store: (1) phase 1 information and type data (P1_WrInfo and P1_WrType) from P1WD register 264, and (2) phase 2 information and type data (P2_WrInfo and P2_WrType) from P1WD register 266. FIFO 228 also includes a load control circuit 227 and an unload control circuit 229, and unbuffered write (UW) FIFO 230 also includes a load control circuit 231 and an unload control circuit 233.

Figure 11:
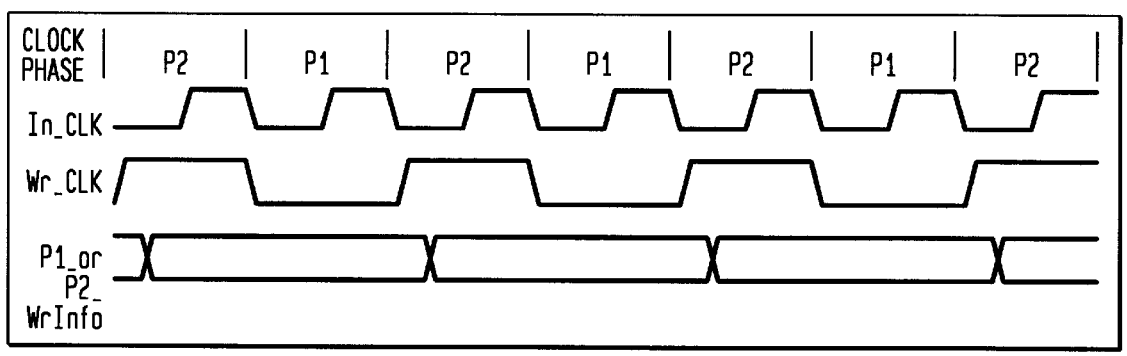
FIG. 11 is a timing diagram showing the relationship between various signals used to control the buffered and unbuffered write FIFOs shown in FIG. 10.

Referring briefly to FIG. 11, a timing diagram is provided that shows the relationship between the incoming clock signal In_CLK, the write clock signal Wr_CLK from divide-by-two circuit 295 (shown FIG. 6), and the P1 and P2_WrInfo (which is the information that has been written to FIFO 228 or 230 from registers 264 and 266). These signals are shown on the same time scale (horizontal axis) for comparison. The physical placement of one signal above another does not denote that one attains a higher magnitude than the other signals. As shown in FIG. 10, each of load control circuits 227 and 231 receives the Wr_CLK signal as a clock input. Load control circuit 227 also receives a buffered information load signal (B_WrInfoLd), which is a result of the above-explained examination of the type bits to identify whether information is of the buffered or unbuffered type. Load control circuit 227 provides a buffered write full signal (B_WrFull), which is asserted when buffered write (BW) FIFO 228 is within four entries of being full and is de-asserted when buffered write (BW) FIFO 228 has five or more entries available to be filled. Similarly, load control circuit 231 receives an unbuffered information load signal (U_WrInfoLd), which also is a result of the above-explained examination of the type bits to identify whether information is of the buffered or unbuffered type. Load control circuit 231 provides an unbuffered write full signal (U_WrFull), which is asserted when unbuffered write (UW) FIFO 230 is within four entries of being full and is de-asserted when unbuffered write (UW) FIFO 230 has five or more entries available to be filled.

Each of unload control circuits 229 and 233 also receives a respective core clock signal and an unload signal from the core (which permit the core to unload information from the FIFOs at the core clock rate when one of the unload signals is asserted), and provides a respective empty signal to the core (which indicates to the core that that FIFO presently has no information stored in it). Thus, the core may access the P1 and P2 information and type data (P1_Info, P1_Type, P2_Info and P2_Type) from either of buffered write (BW) and unbuffered write (UW) FIFOs 228 and 230, at a rate that is asynchronous to the clock rate at which these FIFOs receive the information and type data from interface circuit 226.

Figure 12:
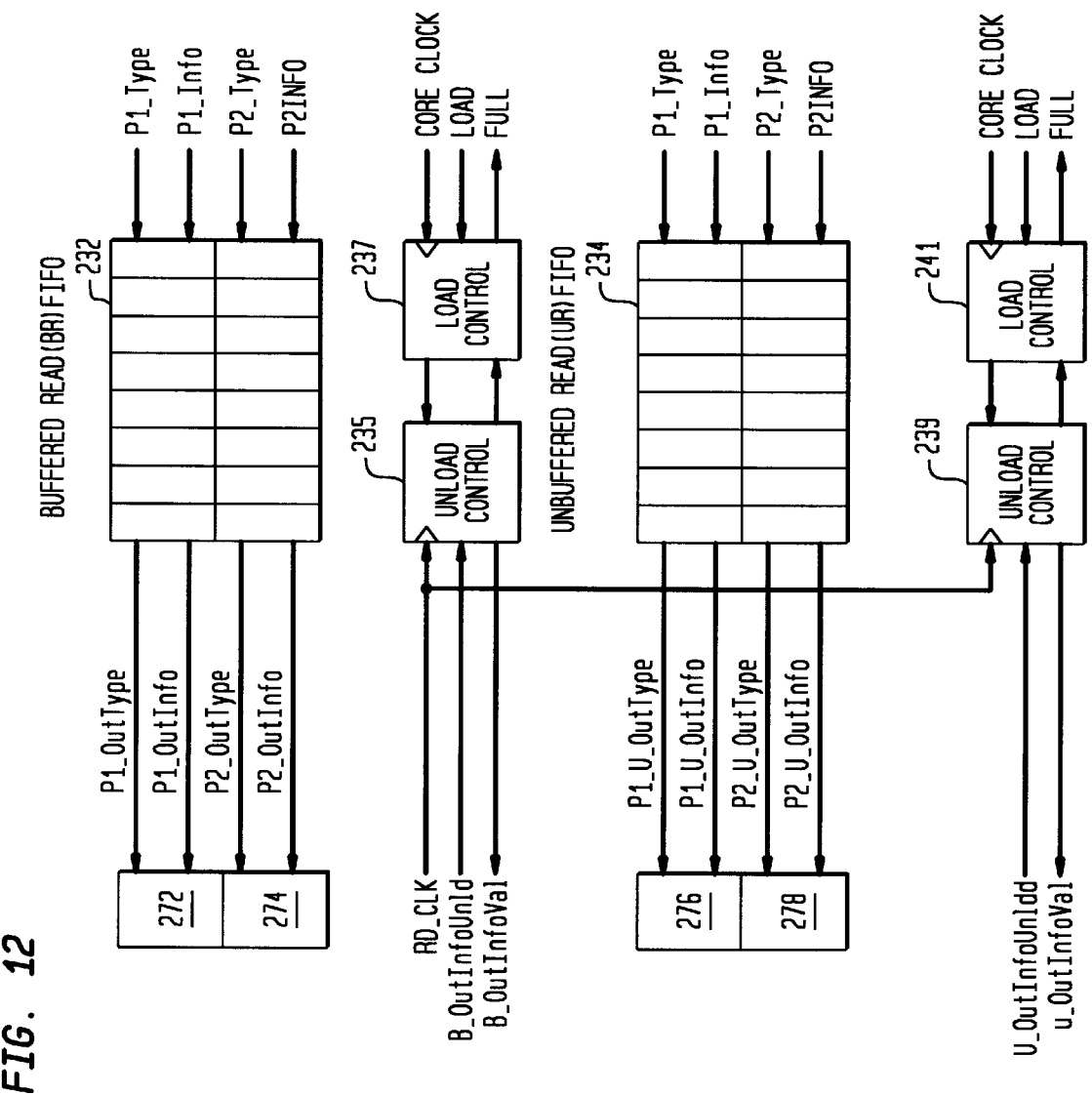
FIG. 12 is a more detailed block diagram of the buffered and unbuffered read FIFOs shown in FIG. 6 and shows how these FIFOs might operate when a processing element is configured in detour mode.

Each of FIGS. 12 and 13 shows asynchronous buffered read (BR) and unbuffered read (UR) FIFOs 232 and 234 in more detail. FIG. 12 shows how buffered read (BR) and unbuffered read (UR) FIFOs 232 and 234 might operate when processing element 222 is configured in detour mode, and FIG. 13 shows how buffered read (BR) and unbuffered read (UR) FIFOs 232 and 234 might operate when processing element is not configured in detour mode (such as the configuration shown in FIG. 6). Referring first to FIG. 12, when processing element 222 is configured in detour mode, a selected one of buffered read (BR) and unbuffered read (UR) FIFOs 232 and 234 receives both portions of an information packet (i.e., phase 1 information (P1_Info) and type data (P1_Type) and phase 2 information (P2_Info) and type data (P2_Type)) from the core, along with a core clock and a load signal, and provides to the core a "full" signal to indicate to the core when the respective one of the FIFOs is full. In the example shown, each of buffered read (BR) and unbuffered read (UR) FIFOs 232 and 234 is eight entries deep, but the necessary depth of the read FIFOs will be determined by the operations to be performed by the core. As shown in FIG. 12, buffered read (BR) FIFO 232 provides both portions of a buffered information packet (i.e., phase 1 output information (P1_OutInfo) and type data (P1_OutType) and phase 2 output information (P2_OutInfo) and type data (P2_OutType) to interface circuit 226. Specifically, phase 1 output information P1_OutInfo and type data P1_OutType is provided to P1_OUT register 272, and phase 2 output information P2_OutInfo and type data P2_OutType is provided to P2_OUT register 274. Similarly, unbuffered read (UR) FIFO 234 provides both portions of an unbuffered information packet to interface circuit 226. That is, phase 1 unbuffered output information (P1_U_OutInfo) and type data (P1_U_OutType) is provided from unbuffered read (UR) FIFO 234 to U_P1_OUT register 276 and phase 2 unbuffered output information (P2_U_OutInfo) and type data (P2_U_OutType) is provided from unbuffered read (UR) FIFO 234 to U_P2_OUT register 278.

Referring now to FIG. 13, when processing element 222 is not configured in detour mode, a selected one of buffered read (BR) and unbuffered read (UR) FIFOs 232 and 234 receives information from the core along with mask data, explained below, associated with the information. When not in detour mode, the type data associated with each portion of an information packet is not relevant and is ignored. At its output, buffered read (BR) FIFO 232 provides either of the two portions of a buffered information packet (i.e., either phase 1 buffered output information (P1_OutInto) or phase 2 buffered output information (P2_OutInfo)), as well as the mask data (OutMask) from the core, to interface circuit 226. Specifically, either phase 1 buffered output information P1_OutInfo or phase 2 buffered output information P2_OutInfo is provided to both of P1_OUT register 272 and P2_OUT register 274, and thirty-two bits of buffered mask data (OutMask) is provided to mask register 284. Similarly, unbuffered read (UR) FIFO 234 provides either portion of an unbuffered information packet as well as unbuffered mask data (OutMask) from the core, to interface circuit 226. Specifically, either phase 1 unbuffered output data (P1_U_OutInfo) or phase 2 unbuffered output data (P2_U_OutInfo) is provided to both of U_P1_OUT register 276 and U_P2_OUT register 278, and unbuffered mask data (OutMask) is provided to mask register 284. According to one embodiment, only a single bit of unbuffered mask data is used.

The buffered mask data (OutMask) transferred to mask register 284 (when buffered information is being read) is used to perform a selective masking or "bit slicing" of the buffered information output from the core. In this manner, the thirty-two bit mask selects buffered information, on a bit-by-bit basis, from one of: (1) the buffered information output from the core, and (2) either the buffered information flowing through pass through path 261 or the buffered information read from backup information path 290. The single bit of unbuffered mask data (OutMask) transferred to mask register 284 (when unbuffered information is being read) is used to select an entire thirty-two bit information word from one of the two sources just listed. It should be noted that, alternatively, thirty-two bits of unbuffered mask data could be used to selectively mask "bit-by-bit" the unbuffered information from the core.

Figure 14:
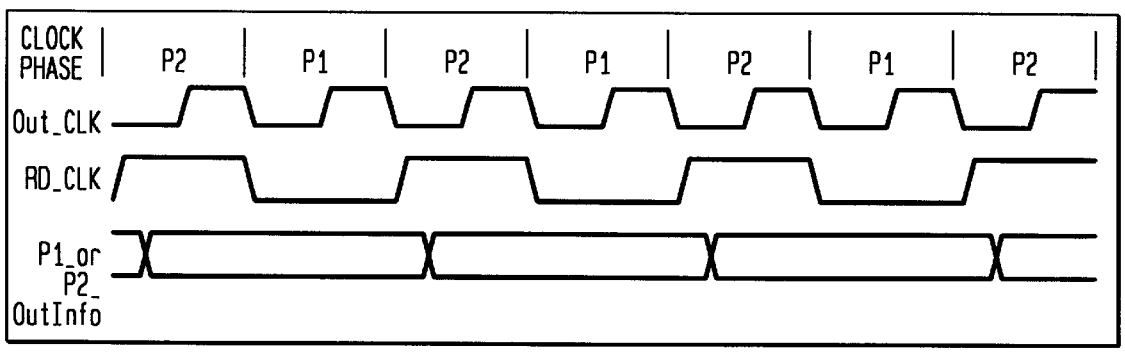
FIG. 14 is a timing diagram showing the relationship between various signals used to control the buffered and unbuffered read FIFOs shown in FIGS. 12 and 13.

Referring briefly to FIG. 14, a timing diagram is provided that shows the relationship between the outgoing clock signal Out_CLK, the read clock signal RD_CLK from divide-by-two circuit 297 (shown in FIG. 6), and the buffered output information from one of read FIFOs 232 and 234. Buffered output information, i.e., P1 and P2_OutInfo, from buffered read (BR) FIFO 232 is shown as an example and could just as well represent unbuffered output information P1 and P2_U_OutInfo. These signals are shown on the same time scale (horizontal axis) for comparison. The physical placement of one signal above another does not denote that one attains a higher magnitude than the other signals.

In FIGS. 12 and 13, buffered read (BR) FIFO 232 includes unload control circuit 235 and load control circuit 237, and unbuffered read (UR) FIFO 234 includes unload control circuit 239 and load control circuit 241. The information and mask data is loaded into one of the FIFOs upon a transition of the core clock when the load signal to one of load control circuits 237 or 241 is asserted, and is unloaded from one of the FIFOs upon a transition of the clock signal RD_CLK when either the buffered or unbuffered unload signal (B_OutInfoUnld or U_OutInfoUnld) to one of unload control circuits 235 and 239 is asserted. The signals B_OutDatVal and U_OutDatVal from unload control circuits 235 and 239, respectively, indicate that buffered or unbuffered information is ready to be clocked into a corresponding one of read registers 272, 274, 276 and 278.

As noted previously, by controlling FIFOs 228, 230, 232 and 234, and backup information path 290 such that unbuffered (i.e., priority) information always takes precedence over buffered (i.e., non-priority) information, two distinct types of information may be passed through a pipeline along a single bus without requiring any non-priority information that is in the pipeline to be flushed from the pipeline or discarded before the priority information can be sent. That is, any non-priority information present in the pipeline when a priority information packet enters the interface may be held stationary in any of the non-priority information storage elements in either of the non-priority information paths (i.e., in buffered read (BR) FIFO 232, buffered write (BW) FIFO 228 or buffered backup path 292) until the priority information passes through the interface, at which time the non-priority information again may be transmitted. By sharing each of the incoming and outgoing buses of an interface circuit (e.g., interface circuit 226) for two unique and independent pipelined paths, rather than providing dedicated paths for each of priority and non-priority information, a significant savings in hardware and ASIC pin count is realized over prior art systems that provide only pipelined busing solutions involving no sharing of resources.

Although, the invention has been described herein as employing a bus capable of transmitting a particular number of bits and as using particular control signals to control the propagation of information throughout the circuit, a bus of any width and any control signals that perform similar functions are intended to be within the scope of the present invention. Additionally, although the circuit elements have been described herein as being clocked on particular edges of clock signals, these elements could equivalently be clocked on the opposite edges of clock signals without departing from the scope of the invention.

In addition, although specific types of information storage elements have been described as being employed in the invention, any alternative types of information storage elements may equivalently be employed according to the intended scope of the invention. Also, while the circuit has been described as being implemented using ASICs, it may equivalently be implemented using dedicated hardware, appropriately programmed firmware or software, or any combination thereof.

Further, although the bus system has been described as being used to interconnect several graphics processing devices of a graphics processing system, the scope of the invention is not limited to graphics processing applications, and the bus system may equivalently may be used to interconnect any type of processing elements. Similarly, although the interface circuits have been described as being used to interface graphics processing devices to a bus, the scope of the invention is not limited to the interfacing of graphics processing devices, and the interface circuit may equivalently be used to interface any type of devices to a bus.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. An interface circuit interfacing an input bus, an external circuit, and an output bus, comprising:

at least one input storage element adapted to receive input information from the input bus;

at least one output storage element adapted to provide information to the output bus;

a passthrough path connected between the input storage element and the output storage element; and a backup path including at least one backup storage element connected in parallel with the passthrough path between the input storage element and the output storage element;

wherein the input information is provided through the passthrough path to the output storage element when at least one backup storage element is empty and in response to the interface circuit receiving an indication that the input information should be provided to the output bus;

and wherein the input information is provided to and is temporarily stored in the at least one backup storage element in response to the interface circuit receiving an indication that the input information should not be provided to the output bus.

2. The interface circuit as claimed in claim 1, wherein the at least one backup storage element includes a plurality of backup storage elements adapted to store input information received by the input storage element while an upstream circuit continues to send input information on the input bus after the interface circuit has received the indication that the input information should not be provided to the output bus.

3. The interface circuit as claimed in claim 2, wherein the interface circuit is configured such that, if the interface circuit receives the indication that the input information should not be provided to the output bus, then the interface circuit de-asserts an information ready signal provided to an upstream circuit to indicate to the upstream circuit that the upstream circuit should stop sending input information on the input bus.

4. The interface circuit as claimed in claim 1, wherein the interface circuit is configured such that, if the interface circuit receives the indication that the input information should not be provided to the output bus, then the interface circuit de-asserts an information ready signal provided to an upstream circuit to indicate to the upstream circuit that the upstream circuit should stop sending input information on the input bus.

5. The interface circuit as claimed in claim 1, further comprising at least one contents-identifying storage element, separate from the at least one backup storage element, adapted to store information identifying the contents, if any, of at least one of the at least one backup storage element and the at least one input storage element.

6. The interface circuit as claimed in claim 5, wherein:

the at least one backup storage element includes a plurality of backup storage elements; and the at least one contents-identifying storage element includes a plurality of contents-identifying storage elements adapted to store information identifying the contents, if any, of each of the plurality backup storage elements included in the backup path.

7. The interface circuit as claimed in claim 6, wherein the plurality of contents-identifying storage elements also is adapted to store information identifying the contents, if any, of the at least one input storage element.

8. The interface circuit as claimed in claim 1, wherein the external circuit includes a core processor of an ASIC.

9. The interface circuit as claimed in claim 8, wherein the core processor of the ASIC is configured to perform a graphics processing function.

10. The interface circuit as claimed in claim 1, wherein the interface circuit is configured to receive and transmit information that is transferred in information packets including first and second non-concurrently transferred portions.

11. The interface circuit claimed in claim 1 further including at least one external circuit storage element, coupled between the at least one input storage element and the at least one output storage element, adapted to receive external circuit information from the external circuit and provide it to the output storage element when the input information is provided to the at least one backup storage element.

12. A method for communicating information between an input bus, an external circuit and an output bus, comprising the steps of:

receiving input information from the input bus;

in response to receiving an indication that the input information should not be transmitted on the output bus, transferring the input information to a backup information path connected between the input bus and the output bus; and in response to receiving an indication that input information may be transmitted on the output bus;

if any input information has been transferred to the backup information path, then transmitting the input information from the backup information path to the output bus; and if the backup information path is empty, then transmitting the input information from the input bus to the output bus through a passthrough path connected in parallel with the backup information path between the input bus and the output bus.

13. The method of claim 12, further including the step of:

in response to receiving the indication that the input information should not be transmitted on the output bus, de-asserting an information ready signal provided to an upstream circuit to indicate to the upstream circuit that the upstream circuit should stop sending input information on the input bus.

14. An interface circuit coupling an input bus, an output bus and an external circuit comprising:

an input storage element coupled to the input bus;

an output storage element coupled to the output bus;

a passthrough path connected between the input storage element and the output storage element; and a backup path, including at least one backup storage element, connected between the input storage element and the output storage element;

wherein the output storage element receives information at any one time from one of the input storage element through the passthrough path, the backup storage element and the external circuit; and wherein the input storage element receives information from the input bus and provides the information at any one time to one of the output storage element through the passthrough path and the backup storage element.

15. The interface circuit as claimed in claim 14, wherein the external circuit includes a core processor of an ASIC.

16. The interface circuit as claimed in claim 15, wherein the core processor of the ASIC is configured to perform a graphics processing function.

17. The interface circuit as claimed in claim 14, wherein the input storage element provides the information to the backup storage element when the interface circuit receives an indication that either a downstream circuit is unavailable to receive the information or the information is being provided to the output storage element from the external circuit.

* * * * *